(12) United States Patent
Dinan

(10) Patent No.: US 9,924,526 B2
(45) Date of Patent: Mar. 20, 2018

(54) RADIO RESOURCE CONTROL MECHANISM IN A WIRELESS DEVICE AND WIRELESS NETWORK

(71) Applicant: Ofinno Technologies, LLC, Herndon, VA (US)

(72) Inventor: Esmael Hejazi Dinan, Herndon, VA (US)

(73) Assignee: Ofinno Technologies, LLC, Herndon, VA (US)

( * ) Notice: Subject to any disclaimer, the term of this patent is extended or adjusted under 35 U.S.C. 154(b) by 138 days.

(21) Appl. No.: 15/060,247

(22) Filed: Mar. 3, 2016

(65) Prior Publication Data

US 2016/0270095 A1 Sep. 15, 2016

Related U.S. Application Data

(60) Provisional application No. 62/130,580, filed on Mar. 9, 2015, provisional application No. 62/137,519, filed on Mar. 24, 2015.

(51) Int. Cl.
| | |
|---|---|
| *H04W 4/00* | (2009.01) |
| *H04W 72/08* | (2009.01) |
| *H04L 5/00* | (2006.01) |
| *H04W 28/02* | (2009.01) |
| *H04W 72/04* | (2009.01) |
| *H04W 76/04* | (2009.01) |

(Continued)

(52) U.S. Cl.
CPC ........... *H04W 72/085* (2013.01); *H04J 11/00* (2013.01); *H04L 1/1812* (2013.01); *H04L 5/0057* (2013.01); *H04L 5/0091* (2013.01); *H04L 5/0098* (2013.01); *H04W 28/0236* (2013.01); *H04W 72/0413* (2013.01); *H04W 76/046* (2013.01); *H04W 88/02* (2013.01); *H04W 88/08* (2013.01)

(58) Field of Classification Search
CPC ............. H04W 72/085; H04W 76/046; H04W 72/0413; H04W 28/0236; H04W 88/02; H04W 88/08; H04L 1/1812; H04L 5/0057; H04L 5/0091; H04L 5/0098; H04J 11/00
See application file for complete search history.

(56) References Cited

U.S. PATENT DOCUMENTS

| | | | | |
|---|---|---|---|---|
| 2013/0259003 | A1* | 10/2013 | Kwon ................... | H04W 36/08 370/331 |
| 2015/0181479 | A1* | 6/2015 | Lin .................... | H04W 36/0061 370/331 |

OTHER PUBLICATIONS

3GPP TS 36.211 V12.4.0 (Dec. 2014), Technical Specification, 3rd Generation Partnership Project; Technical Specification Group Radio Access Network; Evolved Universal Terrestrial Radio Access (E-UTRA); Physical channels and modulation, 3GPP, Valbonne, France.

(Continued)

*Primary Examiner* — Afshawn Towfighi
(74) *Attorney, Agent, or Firm* — David Grossman; Esmael Dinan

(57) ABSTRACT

Cells are grouped into a plurality of physical uplink control channel (PUCCH) groups comprising a primary PUCCH group and a secondary PUCCH group. A base station detects a radio link issue with a PUCCH secondary cell while one or more other cells in the secondary PUCCH group have acceptable radio link quality. The base station transmits at least one second message configured to release at least one of the one or more other cells in the secondary PUCCH group.

20 Claims, 24 Drawing Sheets

(51) Int. Cl.
*H04J 11/00* (2006.01)
*H04L 1/18* (2006.01)
*H04W 88/02* (2009.01)
*H04W 88/08* (2009.01)

(56) References Cited

OTHER PUBLICATIONS

3GPP TS 36.212 V12.3.0 (Dec. 2014), Technical Specification, 3rd Generation Partnership Project; Technical Specification Group Radio Access Network; Evolved Universal Terrestrial Radio Access (E-UTRA); Multiplexing and channel coding, 3GPP, Valbonne, France.
3GPP TS 36.213 V12.4.0 (Dec. 2014), Technical Specification, 3rd Generation Partnership Project; Technical Specification Group Radio Access Network; Evolved Universal Terrestrial Radio Access (E-UTRA); Physical layer procedures, Valbonne, France.
3GPP TS 36.300 V12.4.0 (Dec. 2014), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Valbonne, France.
3GPP TS 36.321 V12.4.0 (Dec. 2014), Technical Specification, 3rd Generation Partnership Project; Technical Specification Group Radio Access Network; Evolved Universal Terrestrial Radio Access (E-UTRA); Medium Access Control (MAC) protocol specification, Valbonne, France.
3GPP TS 36.331 V12.4.1 (Dec. 2014), Technical Specification, 3rd Generation Partnership Project; Technical Specification Group Radio Access Network; Evolved Universal Terrestrial Radio Access (E-UTRA); Radio Resource Control (RRC); Protocol specification, Valbonne, France.
3GPP TSG RAN WG2 #89 R2-150518, Feb. 9 to Feb. 13, 2015, Athens, Greece, Souce: Samsung, Title: Overivew for PUCCH on SCell.
3GPP TSG RAN WG2 Meeting #89 R2-150038, Athens, Greece, Feb. 9-13, 2015, 3GPP TSG RAN WG1 Meeting #80 R1-150858, Athens, Greece, Feb. 9-13, 2015, Title: LS on RAN1 agreements on PUCCH on SCell for CA, Release: Rel-13, Work Item: LTE_CA_enh_b5C-Core, Source: TSG RAN WG1.
3GPP TSG RAN WG2 Meeting #89 R2-150169, Athens, Greece, Feb. 9-13, 2015, Souce: Intel Corporation, Title: Considerations for PUCCH on SCell in carrier aggregation.
3GPP TSG RAN WG2 Meeting #89, Athens, Greece, Feb. 9 -13, 2015, R2-150263, Source: CATT, Title: Introduction of PUCCH Ceii Group, Agenda item: 7.2.
3GPP TSG RAN WG2 Meeting RAN2#89, Athens, Greece, Q-13 Feb. 2015, R2-150403, Agenda Item: 7.2, Source: NEC, Title: PUCCH on Scell.
3GPP TSG-RAN WG2 #87, Aug. 22, 2014, Dresden, Germany, R2-143073, Update of R2-141967, Source: NTT DOCOMO, INC, Title: Support of PUCCH on SCell for CA—RAN2 aspects, Agenda Item: 7.1.3.4.
3GPP TSG-RAN WG2 #89 R2-150112, Feb. 9-13, 2015, Athens, Greece, Source: NTT DOCOMO, INC., Title: Discussion on PUCCH on SCell.
3GPP TSG-RAN WG2 #89 Tdoc R2-150389, Athens, Greece, Feb. 9-13, 2015, Source: Ericsson, Title: PUCCH on SCell.
3GPP TSG-RAN WG2 meeting #89 R2-150151, Athens, Greece, Feb. 9-13, 2015, Source: ZTE, Title: Discussion on the impact for the support of PUCCH on SCeii, Agenda item: 7.2.
3GPP TSG-RAN WG2 Meeting #89 R2-150187, Athens, Greece, Feb. 9-13, 2015, Source: Nokia Networks, Nokia Corporation, Title: PUCCH grouping.
3GPP TSG-RAN WG2 Meeting #89 R2-150278, Athens, Greece, Feb. 9-13, 2015, Source: Microsoft Corporation, Title: SCell PUCCH for CA.
3GPP TSG-RAN WG2 Meeting #89 R2-150288, Feb. 9 to Feb. 13, 2015, Athens, Greece, Source: CMCC, Title: Discussion on the scenarios and maximum number of PUCCH serving cells in CA enhancement.
3GPP TSG-RAN WG2 Meeting #89 R2-150379, Athens, Greece, Feb. 9-Feb. 13, 2015, Source : LG Electronics Inc., Title : PUCCH configuration and transmission modeling in CA enhancement.
3GPP TSG-RAN WG2 Meeting #89 R2-150406, Athens, Greece, Feb. 9-13, 2015, Source: Alcatel-Lucent, Alcatel-Lucent Shanghai Bell, Title: Considerations on PUCCH on SCell.
3GPP TSG-RAN WG2 Meeting #89, Athens, Greece, Feb. 9-13, 2015, R2-150372, Agenda Item: 7.2, Source: Huawei, HiSllicon, Title: Introduce PUCCH on SCeli for CA beyond 5 carriers.
3GPP TSG-RAN2 #89 Meeting R2-150290, Athens, Greece, Feb. 9-13, 2015, Source: MediaTek Inc., Title: PUCCH on SCell for CA enhancement beyond 5CCs.

* cited by examiner

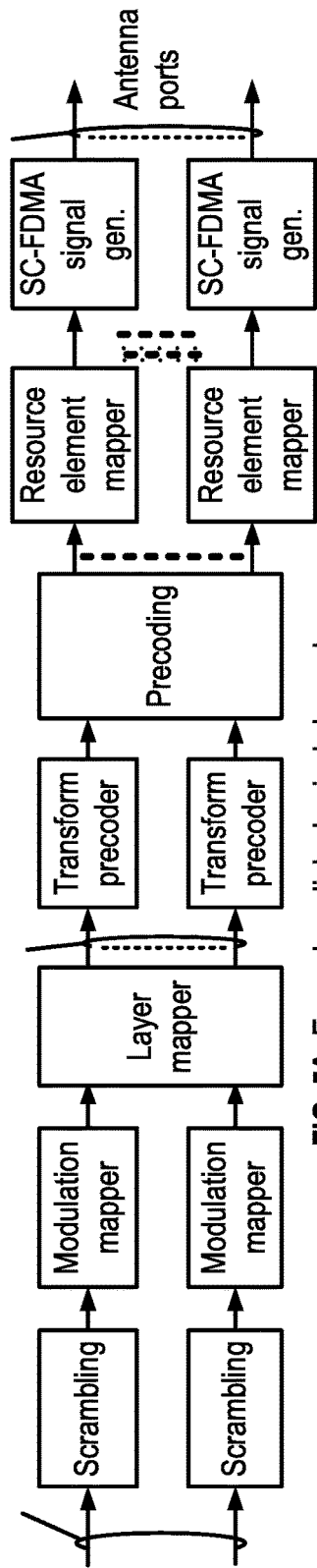
FIG. 5A Example uplink physical channel
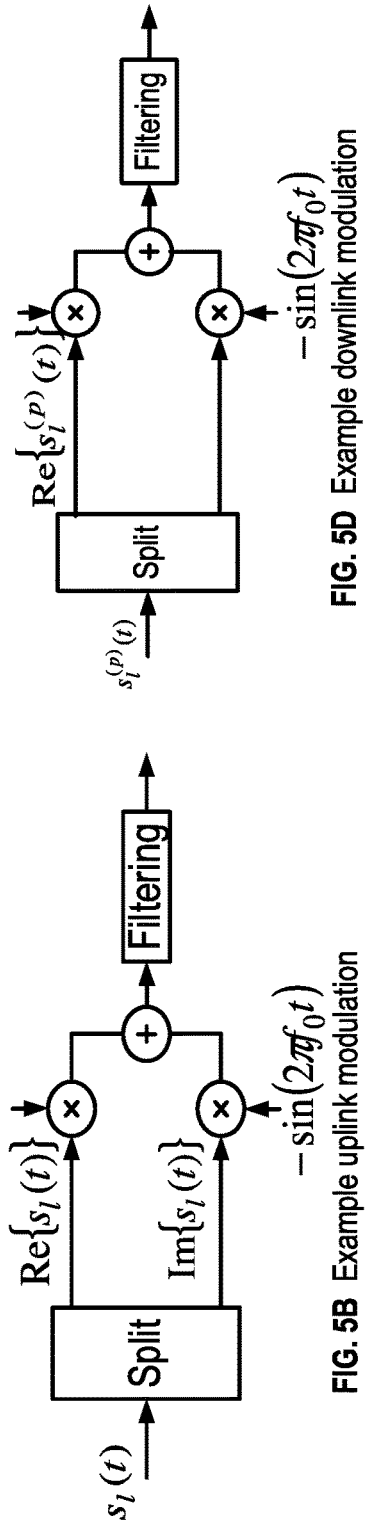
FIG. 5B Example uplink modulation
FIG. 5D Example downlink modulation
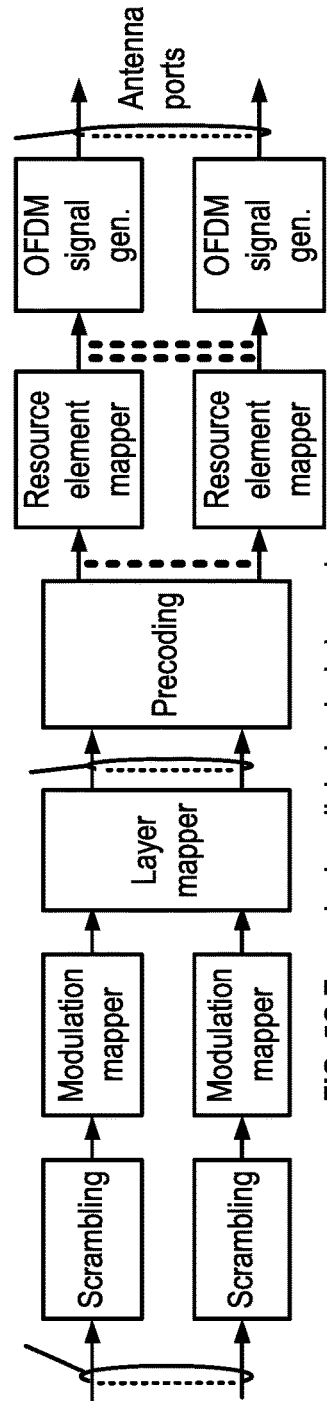
FIG. 5C Example downlink physical channel Dual-Connectivity at eNB

RADIO RESOURCE CONTROL MECHANISM IN A WIRELESS DEVICE AND WIRELESS NETWORK

CROSS-REFERENCE TO RELATED APPLICATIONS

This application claims the benefit of U.S. Provisional Application No. 62/130,580, filed Mar. 9, 2015, and U.S. Provisional Application No. 62/137,519, filed Mar. 24, 2015, which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

DETAILED DESCRIPTION OF EMBODIMENTS

Figure 1:
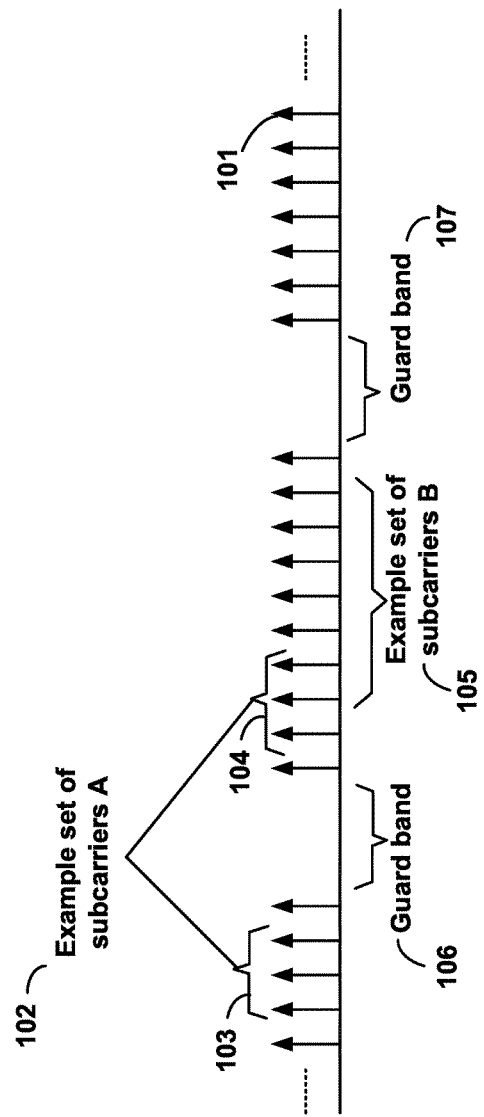
FIG. 1 is a diagram depicting example sets of OFDM subcarriers as per an aspect of an embodiment of the present invention.

Example embodiments of the present invention enable operation of multiple physical uplink control channel (PUCCH) groups. Embodiments of the technology disclosed herein may be employed in the technical field of multicarrier communication systems. More particularly, the embodiments of the technology disclosed herein may relate to operation of PUCCH groups.

The following Acronyms are used throughout the present disclosure:

| | |
|---|---|
| ASIC | application-specific integrated circuit |
| BPSK | binary phase shift keying |
| CA | carrier aggregation |
| CSI | channel state information |
| CDMA | code division multiple access |
| CSS | common search space |
| CPLD | complex programmable logic devices |
| CC | component carrier |
| DL | downlink |
| DCI | downlink control information |
| DC | dual connectivity |
| EPC | evolved packet core |
| E-UTRAN | evolved-universal terrestrial radio access network |
| FPGA | field programmable gate arrays |
| FDD | frequency division multiplexing |
| HDL | hardware description languages |
| HARQ | hybrid automatic repeat request |
| IE | information element |
| LTE | long term evolution |
| MCG | master cell group |
| MeNB | master evolved node B |
| MIB | master information block |
| MAC | media access control |
| MAC | media access control |
| MME | mobility management entity |
| NAS | non-access stratum |
| OFDM | orthogonal frequency division multiplexing |
| PDCP | packet data convergence protocol |
| PDU | packet data unit |
| PHY | physical |
| PDCCH | physical downlink control channel |
| PHICH | physical HARQ indicator channel |
| PUCCH | physical uplink control channel |
| PUSCH | physical uplink shared channel |
| PCell | primary cell |
| PCell | primary cell |
| PCC | primary component carrier |
| PSCell | primary secondary cell |
| pTAG | primary timing advance group |
| QAM | quadrature amplitude modulation |
| QPSK | quadrature phase shift keying |
| RBG | Resource Block Groups |
| RLC | radio link control |
| RRC | radio resource control |
| RA | random access |
| RB | resource blocks |
| SCC | secondary component carrier |
| SCell | secondary cell |
| Scell | secondary cells |
| SCG | secondary cell group |
| SeNB | secondary evolved node B |
| sTAGs | secondary timing advance group |

| | |
|---|---|
| SDU | service data unit |
| S-GW | serving gateway |
| SRB | signaling radio bearer |
| SC-OFDM | single carrier-OFDM |
| SFN | system frame number |
| SIB | system information block |
| TAI | tracking area identifier |
| TAT | time alignment timer |
| TDD | time division duplexing |
| TDMA | time division multiple access |
| TA | timing advance |
| TAG | timing advance group |
| TB | transport block |
| UL | uplink |
| UE | user equipment |
| VHDL | VHSIC hardware description language |

Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
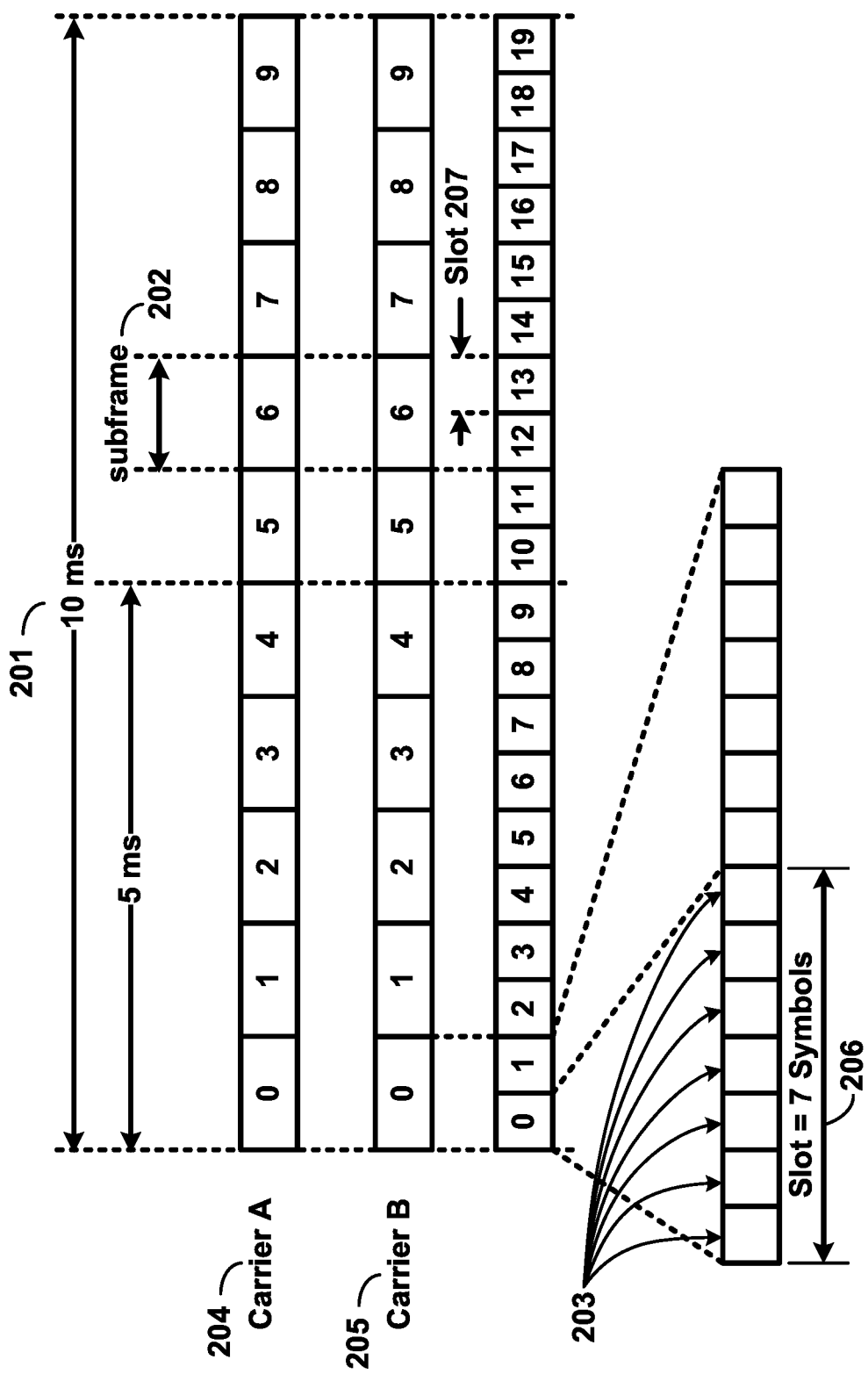
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
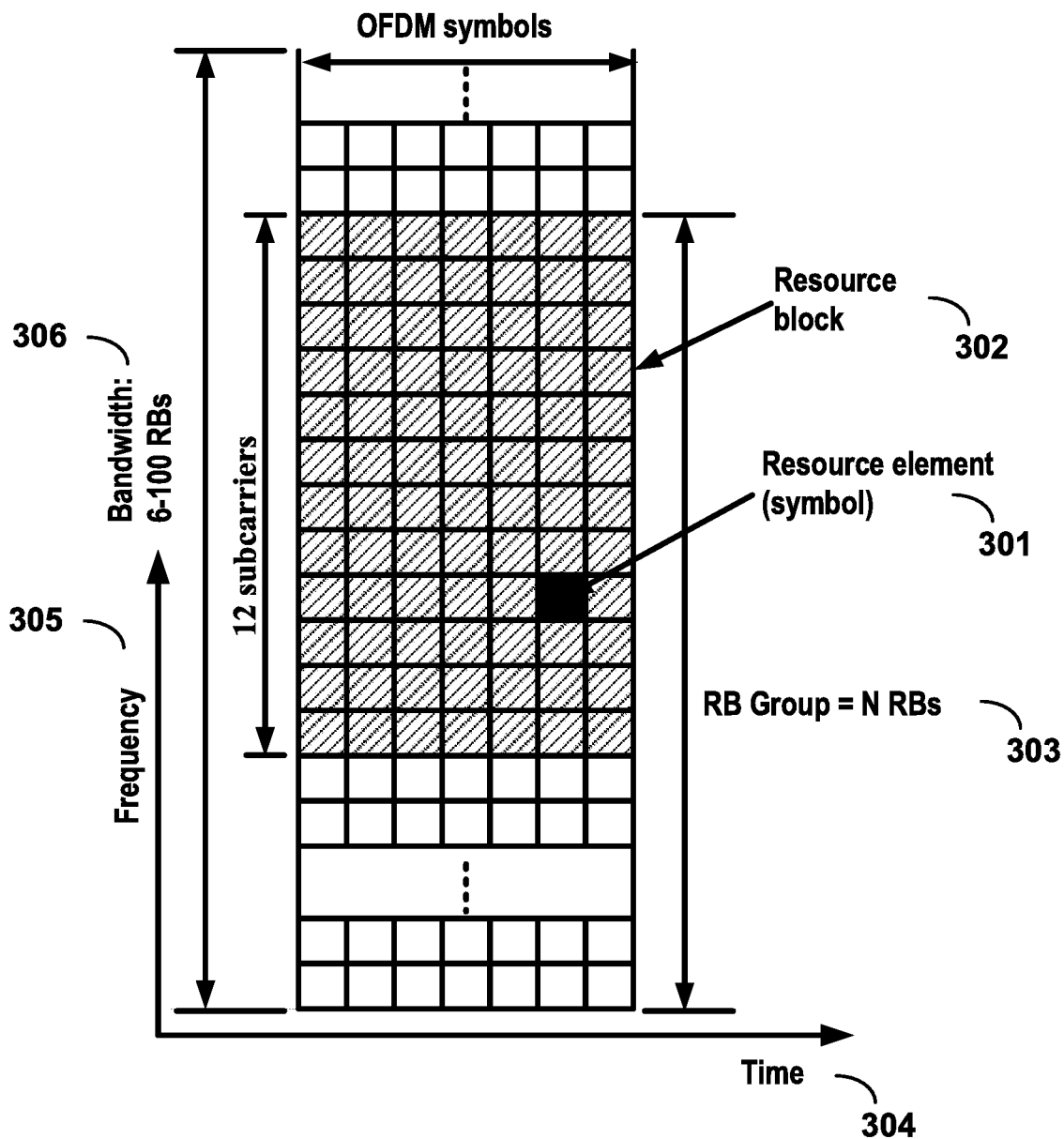
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs (in this example 6 to100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain SC-FDMA signal for each antenna port, and/or the like.

Example modulation and up-conversion to the carrier frequency of the complex-valued SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
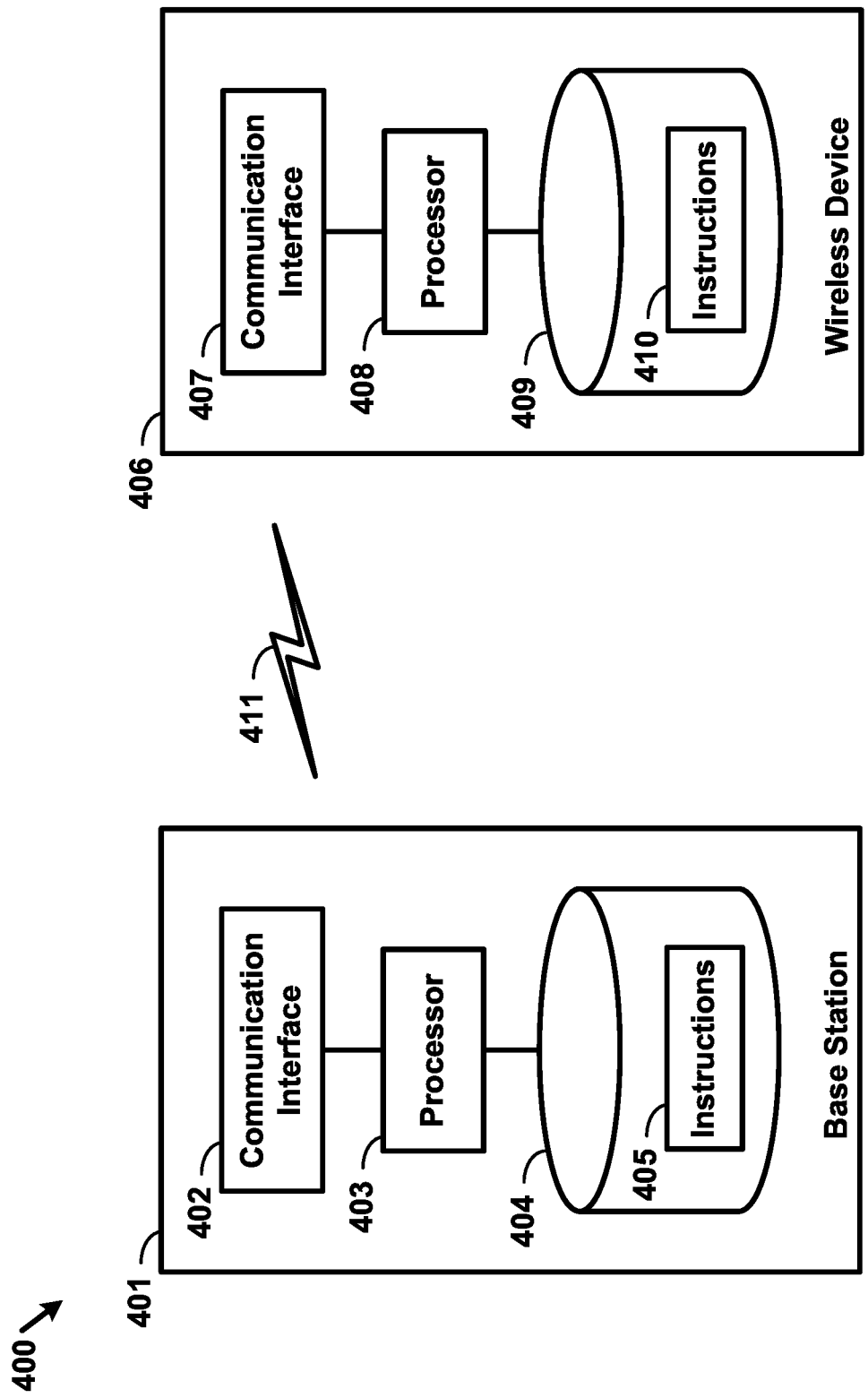
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include a multitude of base stations, providing a user plane PDCP/RLC/MAC/PHY and control plane (RRC) protocol terminations towards the wireless device. The base station(s) may be interconnected with other base station(s) (e.g. employing an X2 interface). The base stations may also be connected employing, for example, an S1 interface to an EPC. For example, the base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
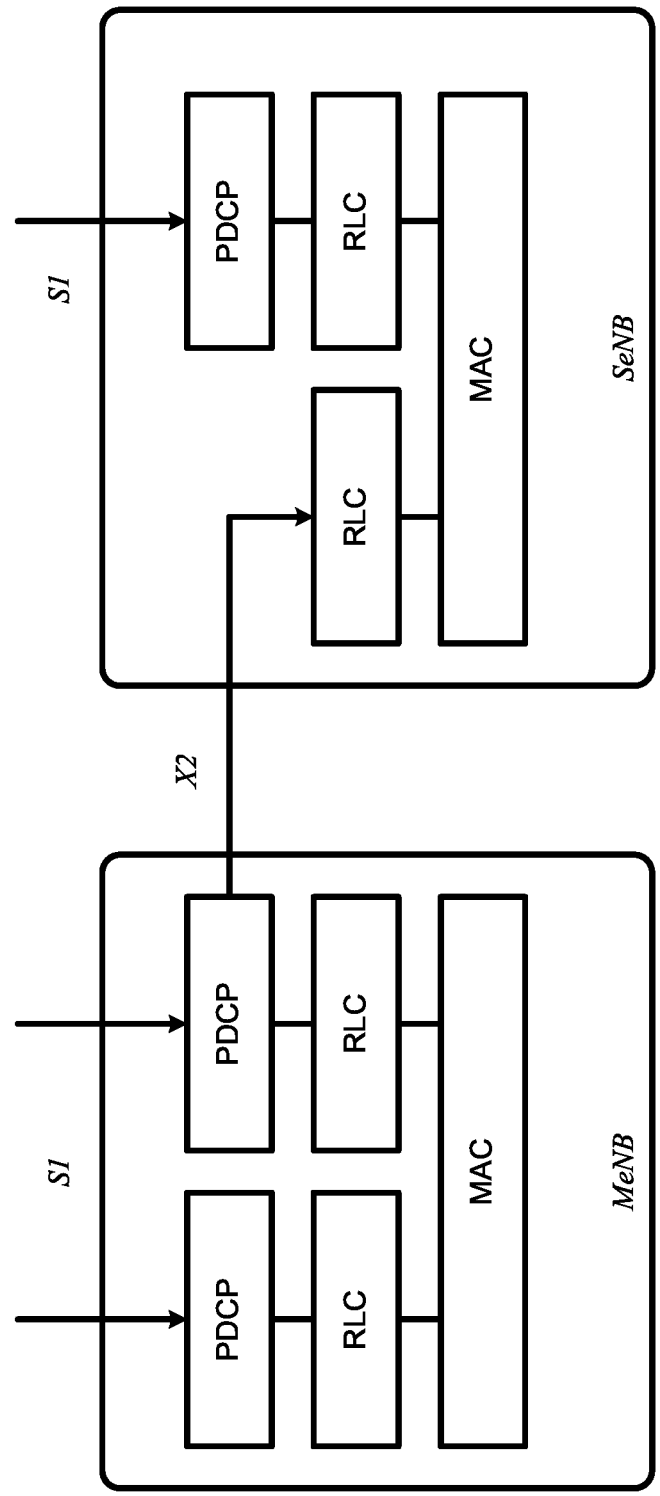
FIG. 6 is an example diagram for a protocol structure with CA and DC as per an aspect of an embodiment of the present invention.
Figure 7:
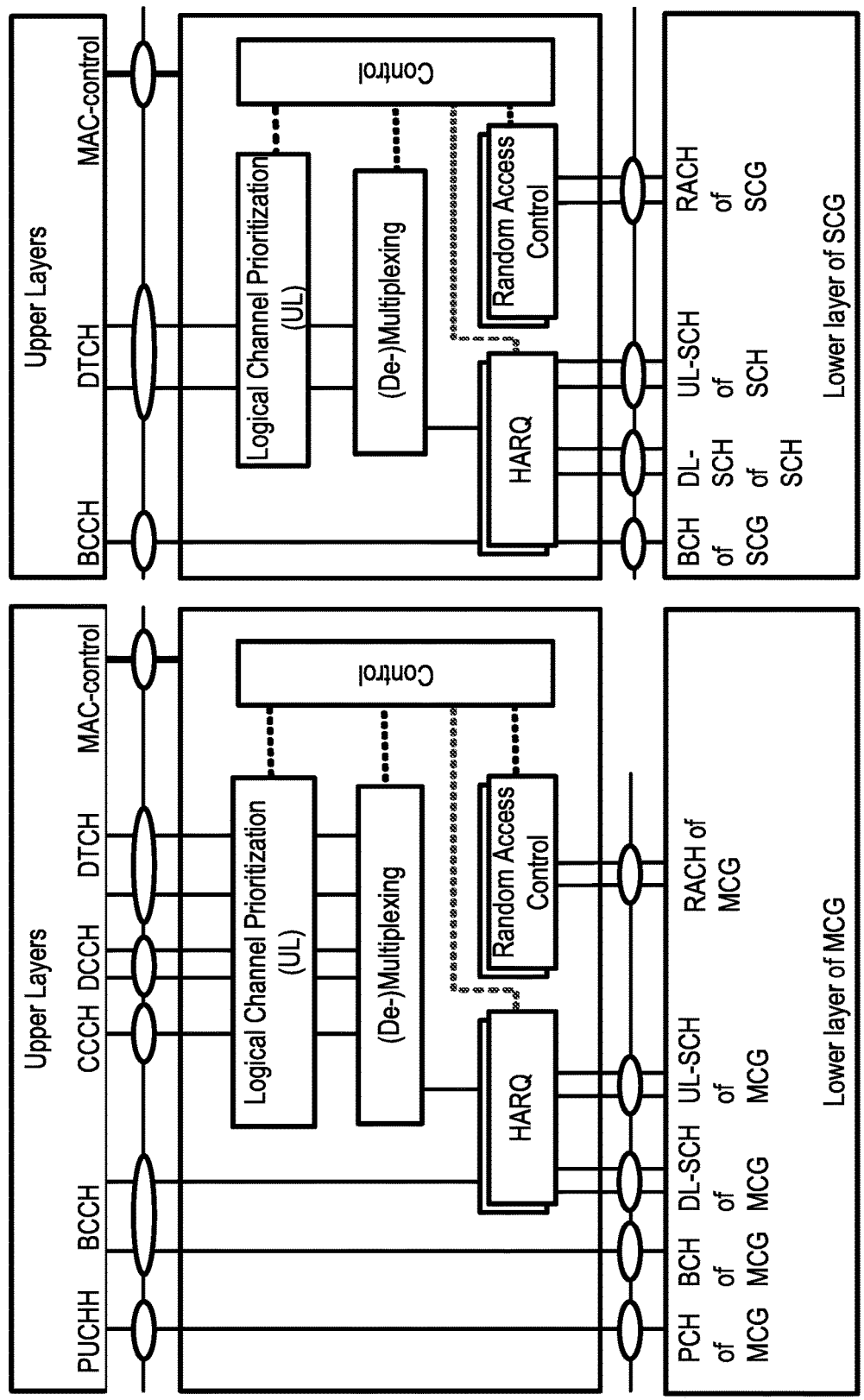
FIG. 7 is an example diagram for a protocol structure with CA and DC as per an aspect of an embodiment of the present invention.

FIG. 6 and FIG. 7 are example diagrams for protocol structure with CA and DC as per an aspect of an embodiment of the present invention. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the invention.

In the case of DC, the UE may be configured with two MAC entities: one MAC entity for MeNB, and one MAC entity for SeNB. In DC, the configured set of serving cells for a UE may comprise of two subsets: the Master Cell Group (MCG) containing the serving cells of the MeNB, and the Secondary Cell Group (SCG) containing the serving cells of the SeNB. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a MeNB may be informed by the UE of a SCG failure type, for split bearer, the DL data transfer over the MeNB is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a MeNB and a SeNB, one or more of the following principles may be applied: the MeNB may maintain the RRM measurement configuration of the UE and may, (e.g, based on received measurement reports or traffic conditions or bearer types), decide to ask a SeNB to provide additional resources (serving cells) for a UE; upon receiving a request from the MeNB, a SeNB may create a container that may result in the configuration of additional serving cells for the UE (or decide that it has no resource available to do so); for UE capability coordination, the MeNB may provide (part of) the AS configuration and the UE capabilities to the SeNB; the MeNB and the SeNB may exchange information about a UE configuration by employing of RRC containers (inter-node messages) carried in X2 messages; the SeNB may initiate a reconfiguration of its existing serving cells (e.g., PUCCH towards the SeNB); the SeNB may decide which cell is the PSCell within the SCG; the MeNB may not change the content of the RRC configuration provided by the SeNB; in the case of a SCG addition and a SCG SCell addition, the MeNB may provide the latest measurement results for the SCG cell(s); both a MeNB and a SeNB may know the SFN and subframe offset of each other by OAM, (e.g., for the purpose of DRX alignment and identification of a measurement gap). In an example, when adding a new SCG SCell, dedicated RRC signalling may be used for sending required system information of the cell as for CA, except for the SFN acquired from a MIB of the PSCell of a SCG.

According to some of the various aspects of embodiments, serving cells having an uplink to which the same time alignment (TA) applies may be grouped in a TA group (TAG). Serving cells in one TAG may use the same timing reference. For a given TAG, user equipment (UE) may use one downlink carrier as a timing reference at a given time. The UE may use a downlink carrier in a TAG as a timing reference for that TAG. For a given TAG, a UE may synchronize uplink subframe and frame transmission timing of uplink carriers belonging to the same TAG. According to some of the various aspects of embodiments, serving cells having an uplink to which the same TA applies may correspond to serving cells hosted by the same receiver. A TA group may comprise at least one serving cell with a configured uplink. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). Carriers within the same TA group may use the same TA value and the same timing reference. When DC is configured, cells belonging to a cell group (MCG or SCG) may be grouped into multiple TAGs including a pTAG and one or more sTAGs.

Figure 8:
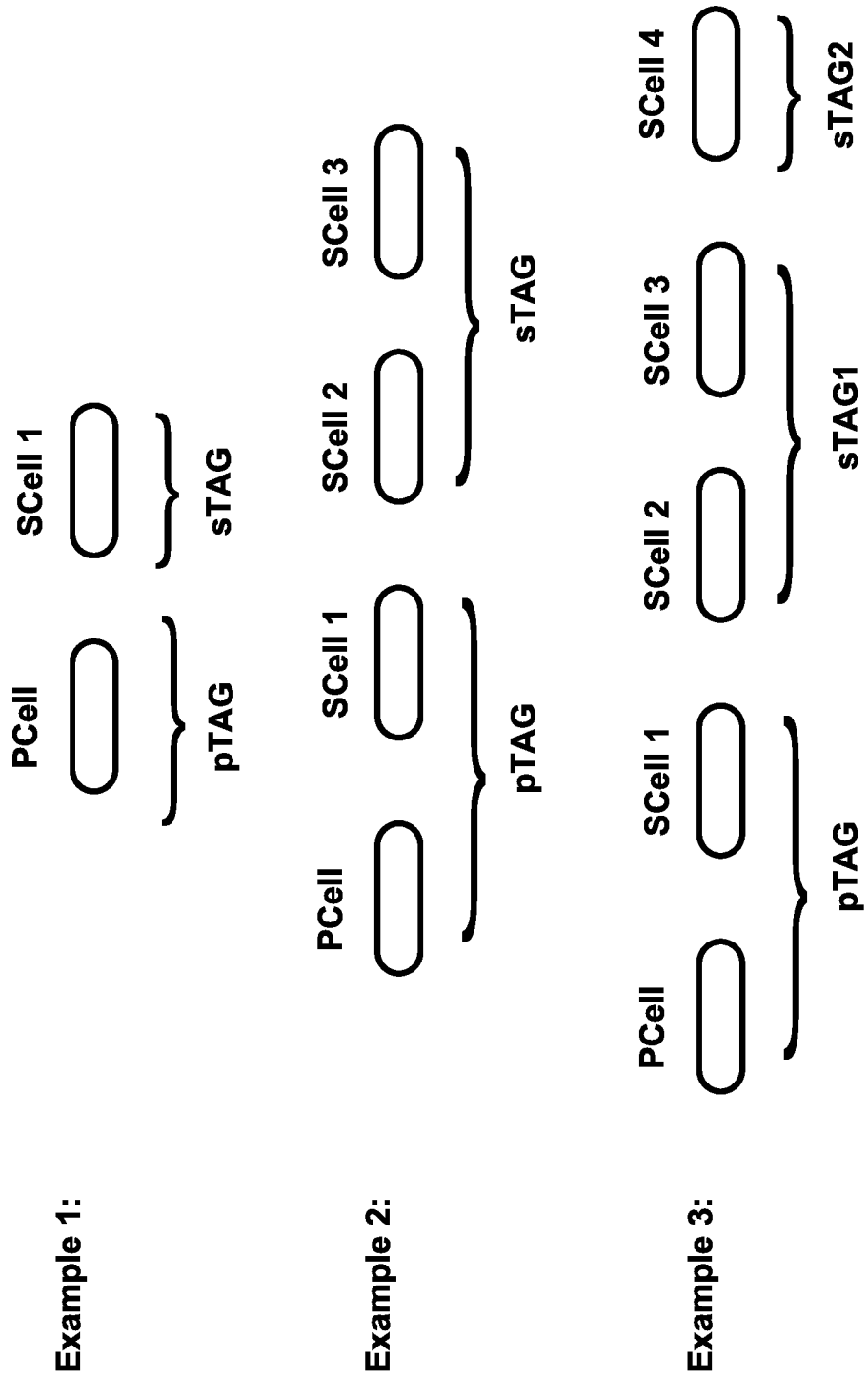
FIG. 8 shows example TAG configurations as per an aspect of an embodiment of the present invention.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. The operation with one example sTAG is described, and the same operation may be applicable to other sTAGs. The example mechanisms may be applied to configurations with multiple sTAGs.

According to some of the various aspects of embodiments, TA maintenance, pathloss reference handling and a timing reference for a pTAG may follow LTE release 10 principles in the MCG and/or SCG. The UE may need to measure downlink pathloss to calculate uplink transmit power. A pathloss reference may be used for uplink power control and/or transmission of random access preamble(s). UE may measure downlink pathloss using signals received on a pathloss reference cell. For SCell(s) in a pTAG, the choice of a pathloss reference for cells may be selected from and/or be limited to the following two options: a) the downlink SCell linked to an uplink SCell using system information block 2 (SIB2), and b) the downlink pCell. The pathloss reference for SCells in a pTAG may be configurable using RRC message(s) as a part of an SCell initial configuration and/or reconfiguration. According to some of the various aspects of embodiments, a PhysicalConfigDedicatedSCell information element (IE) of an SCell configuration may include a pathloss reference SCell (downlink carrier) for an SCell in a pTAG. The downlink SCell linked to an uplink SCell using system information block 2 (SIB2) may be referred to as the SIB2 linked downlink of the SCell. Different TAGs may operate in different bands. For an uplink carrier in an sTAG, the pathloss reference may be only configurable to the downlink SCell linked to an uplink SCell using the system information block 2 (SIB2) of the SCell.

To obtain initial uplink (UL) time alignment for an sTAG, an eNB may initiate an RA procedure. In an sTAG, a UE may use one of any activated SCells from this sTAG as a timing reference cell. In an example embodiment, the timing reference for SCells in an sTAG may be the SIB2 linked downlink of the SCell on which the preamble for the latest RA procedure was sent. There may be one timing reference and one time alignment timer (TAT) per TA group. A TAT for TAGs may be configured with different values. In a MAC entity, when a TAT associated with a pTAG expires: all TATs may be considered as expired, the UE may flush HARQ buffers of serving cells, the UE may clear any configured downlink assignment/uplink grants, and the RRC in the UE may release PUCCH/SRS for all configured serving cells. When the pTAG TAT is not running, an sTAG TAT may not be running. When the TAT associated with an sTAG expires: a) SRS transmissions may be stopped on the corresponding SCells, b) SRS RRC configuration may be released, c) CSI reporting configuration for corresponding SCells may be maintained, and/or d) the MAC in the UE may flush the uplink HARQ buffers of the corresponding SCells.

An eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
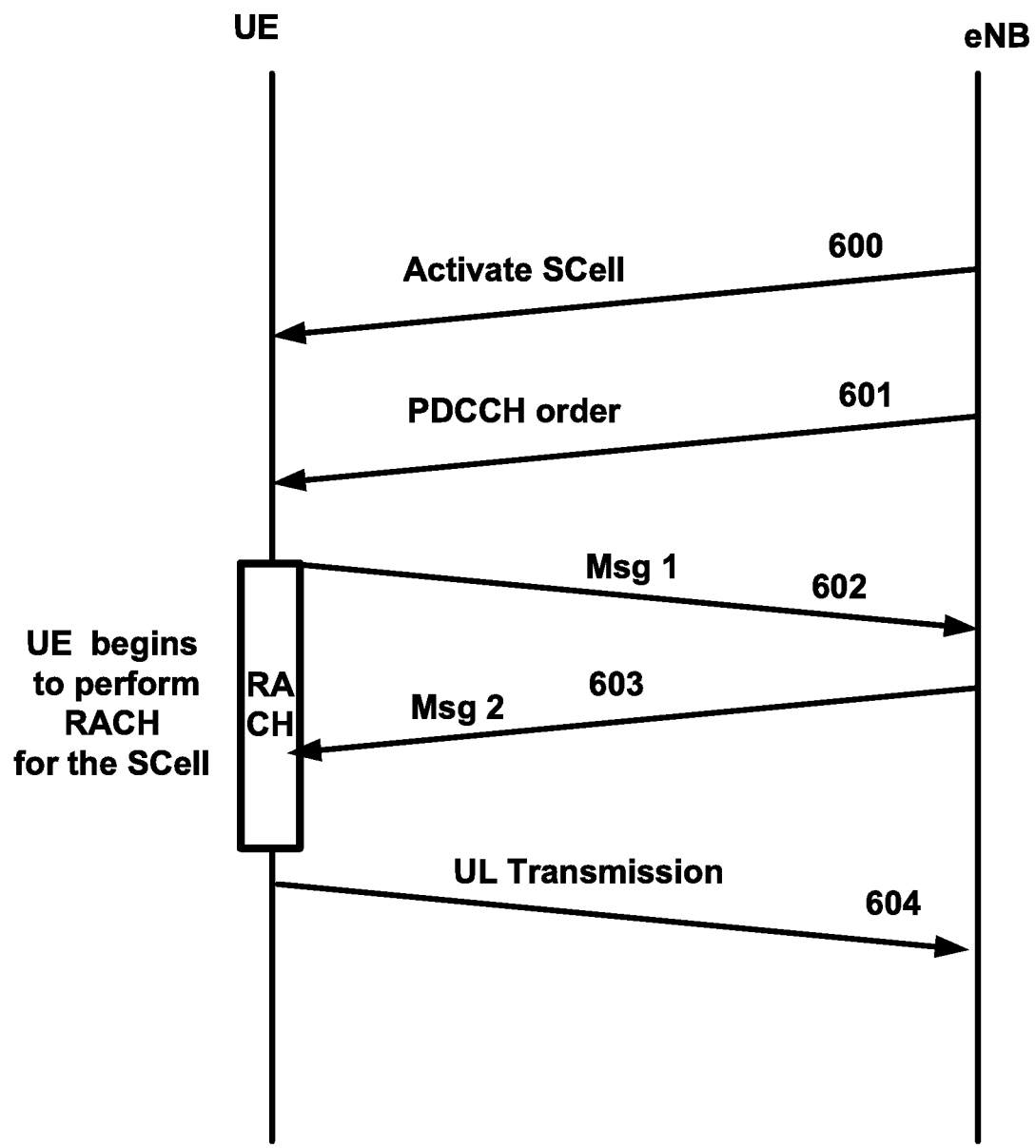
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may always be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

Figure 10:
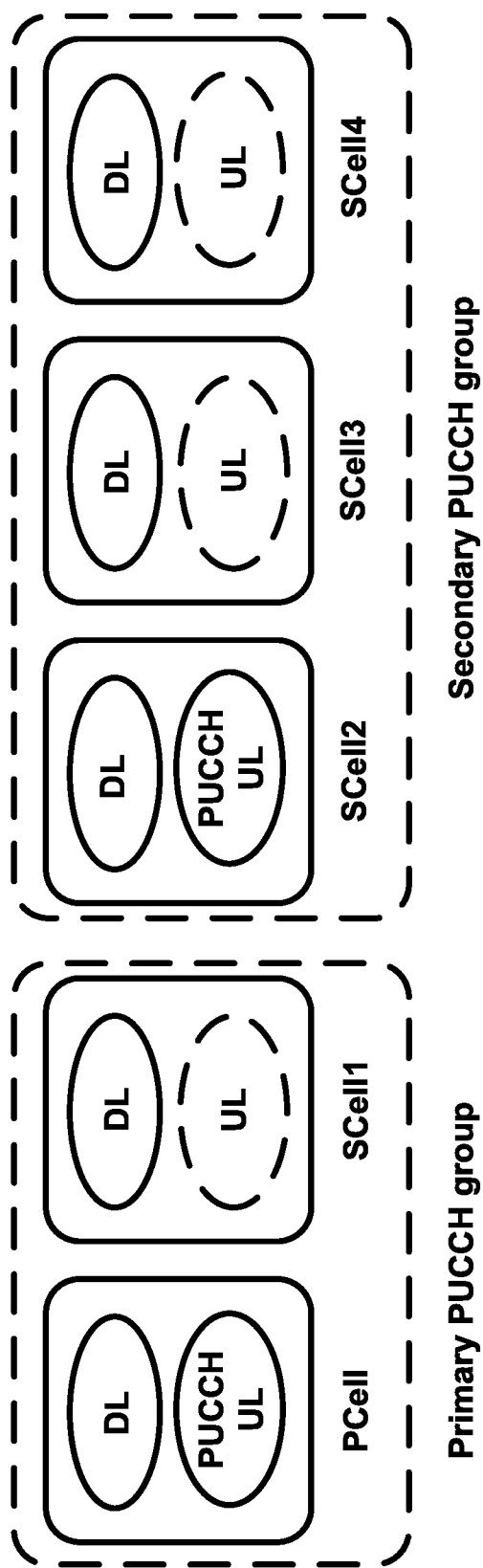
FIG. 10 is an example grouping of cells into PUCCH groups as per an aspect of an embodiment of the present invention.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. FIG. 10 is an example grouping of cells into PUCCH groups as per an aspect of an embodiment of the present invention. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In Release-12, a PUCCH can be configured on a PCell and/or a PSCell, but cannot be configured on other SCells. In an example embodiment, a UE may transmit a message indicating that the UE supports PUCCH configuration on a PCell and SCell. Such an indication may be separate from an indication of of dual connectivity support by the UE. In an example embodiment, a UE may support both DC and PUCCH groups. In an example embodiment, either DC or PUCCH groups may be configured, but not both. In another example embodiment, more complicated configurations comprising both DC and PUCCH groups may be supported.

When a UE is capable of configuring PUCCH groups, and if a UE indicates that it supports simultaneous PUCCH/PUSCH transmission capability, it may imply that the UE supports simultaneous PUCCH/PUSCH transmission on both PCell and SCell. When multiple PUCCH groups are configured, a PUCCH may be configured or not configured with simultaneous PUCCH/PUSCH transmission.

In an example embodiment, PUCCH transmission to a base station on two serving cells may be realized as shown in FIG. 10. A first group of cells may employ a PUCCH on the PCell and may be called PUCCH group 1 or a primary PUCCH group. A second group of cells may employ a PUCCH on an SCell and may be called PUCCH group 2 or a secondary PUCCH group. One, two or more PUCCH groups may be configured. In an example, cells may be grouped into two PUCCH groups, and each PUCCH group may include a cell with PUCCH resources. A PCell may provide PUCCH resources for the primary PUCCH group and an SCell in the secondary PUCCH group may provide PUCCH resources for the cells in the secondary PUCCH group. In an example embodiment, no cross-carrier scheduling between cells in different PUCCH groups may be configured. When cross-carrier scheduling between cells in different PUCCH groups is not configured, ACK/NACK on PHICH channel may be limited within a PUCCH group. Both downlink and uplink scheduling activity may be separate between cells belonging to different PUCCH groups.

A PUCCH on an SCell may carry HARQ-ACK and CSI information. A PCell may be configured with PUCCH resources. In an example embodiment, RRC parameters for an SCell PUCCH Power Control for a PUCCH on an SCell may be different from those of a PCell PUCCH. A Transmit Power Control command for a PUCCH on an SCell may be transmitted in DCI(s) on the SCell carrying the PUCCH.

UE procedures on a PUCCH transmission may be different and/or independent between PUCCH groups. For example, determination of DL HARQ-ACK timing, PUCCH resource determination for HARQ-ACK and/or CSI, Higher-layer configuration of simultaneous HARQ-ACK+CSI on a PUCCH, Higher-layer configuration of simultaneous HARQ-ACK+SRS in one subframe may be configured differently for a PUCCH PCell and a PUCCH SCell.

A PUCCH group may be a group of serving cells configured by a RRC and use the same serving cell in the group for transmission of a PUCCH. A Primary PUCCH group may be a PUCCH group containing a PCell. A secondary PUCCH group may be a PUCCH group not containing the PCell. In an example embodiment, an SCell may belong to one PUCCH group. When one SCell belongs to a PUCCH group, ACK/NACK or CSI for that SCell may be transmitted over the PUCCH in that PUCCH group (over PUCCH SCell or PUCCH PCell). A PUCCH on an SCell may reduce the PUCCH load on the PCell. A PUCCH SCell may be employed for UCI transmission of SCells in the corresponding PUCCH group.

In an example embodiment, a flexible PUCCH configuration in which control signalling is sent on one, two or more PUCCHs may be possible. Beside the PCell, it may be possible to configure a selected number of SCells for PUCCH transmission (herein called PUCCH SCells). Control signalling information conveyed in a certain PUCCH SCell may be related to a set of SCells in a corresponding PUCCH group that are configured by the network via RRC signalling.

PUCCH control signalling carried by a PUCCH channel may be distributed between a PCell and SCells for off-loading or robustness purposes. By enabling a PUCCH in an SCell, it may be possible to distribute the overall CSI reports for a given UE between a PCell and a selected number of SCells (e.g. PUCCH SCells), thereby limiting PUCCH CSI resource consumption by a given UE on a certain cell. It may be possible to map CSI reports for a certain SCell to a selected PUCCH SCell. An SCell may be assigned a certain periodicity and time-offset for transmission of control information. Periodic CSI for a serving cell may be mapped on a PUCCH (on the PCell or on a PUCCH-SCell) via RRC signalling. The possibility of distributing CSI reports, HARQ feedbacks, and/or Scheduling Requests across PUCCH SCells may provide flexibility and capacity improvements. HARQ feedback for a serving cell may be mapped on a PUCCH (on the PCell or on a PUCCH SCell) via RRC signalling.

In example embodiments, PUCCH transmission may be configured on a PCell, as well as one SCell in CA. An SCell PUCCH may be realized using the concept of PUCCH groups, where aggregated cells are grouped into two or more PUCCH groups. One cell from a PUCCH group may be configured to carry a PUCCH. More than 5 carriers may be configured. In the example embodiments, up to n carriers may be aggregated. For example, n may be 16, 32, or 64. Some CCs may have non-backward compatible configurations supporting only advanced UEs (e.g. support licensed assisted access SCells). In an example embodiment, one SCell PUCCH (e.g. two PUCCH groups) may be supported. In another example embodiment, a PUCCH group concept with multiple (more than one) SCells carrying PUCCH may be employed (e.g., there can be more than two PUCCH groups).

In an example embodiment, a given PUCCH group may not comprise serving cells of both MCG and SCG. One of the PUCCHs may be configured on the PCell. In an example embodiment, PUCCH mapping of serving cells may be configured by RRC messages. In an example embodiment, a maximum value of an SCellIndex and a ServCellIndex may be 31 (ranging from 0 to 31). In an example, a maximum value of stag-Id may be 3. The CIF for a scheduled cell may be configured explicitly. A PUCCH SCell may be configured by giving a PUCCH configuration for an SCell. A HARQ feedback and CSI report of a PUCCH SCell may be sent on the PUCCH of that PUCCH SCell. The HARQ feedback and CSI report of a SCell may sent on a PUCCH of a PCell if no PUCCH SCell is signalled for that SCell. The HARQ feedback and CSI report of an SCell may be sent on the PUCCH of one PUCCH SCell; hence they may not be sent on the PUCCH of different PUCCH SCell. The UE may report a Type 2 PH for serving cells configured with a PUCCH. In an example embodiment, a MAC activation/deactivation may be supported for a PUCCH SCell. An eNB may manage the activation/deactivation status for SCells. A newly added PUCCH SCell may be initially deactivated.

Figure 11:
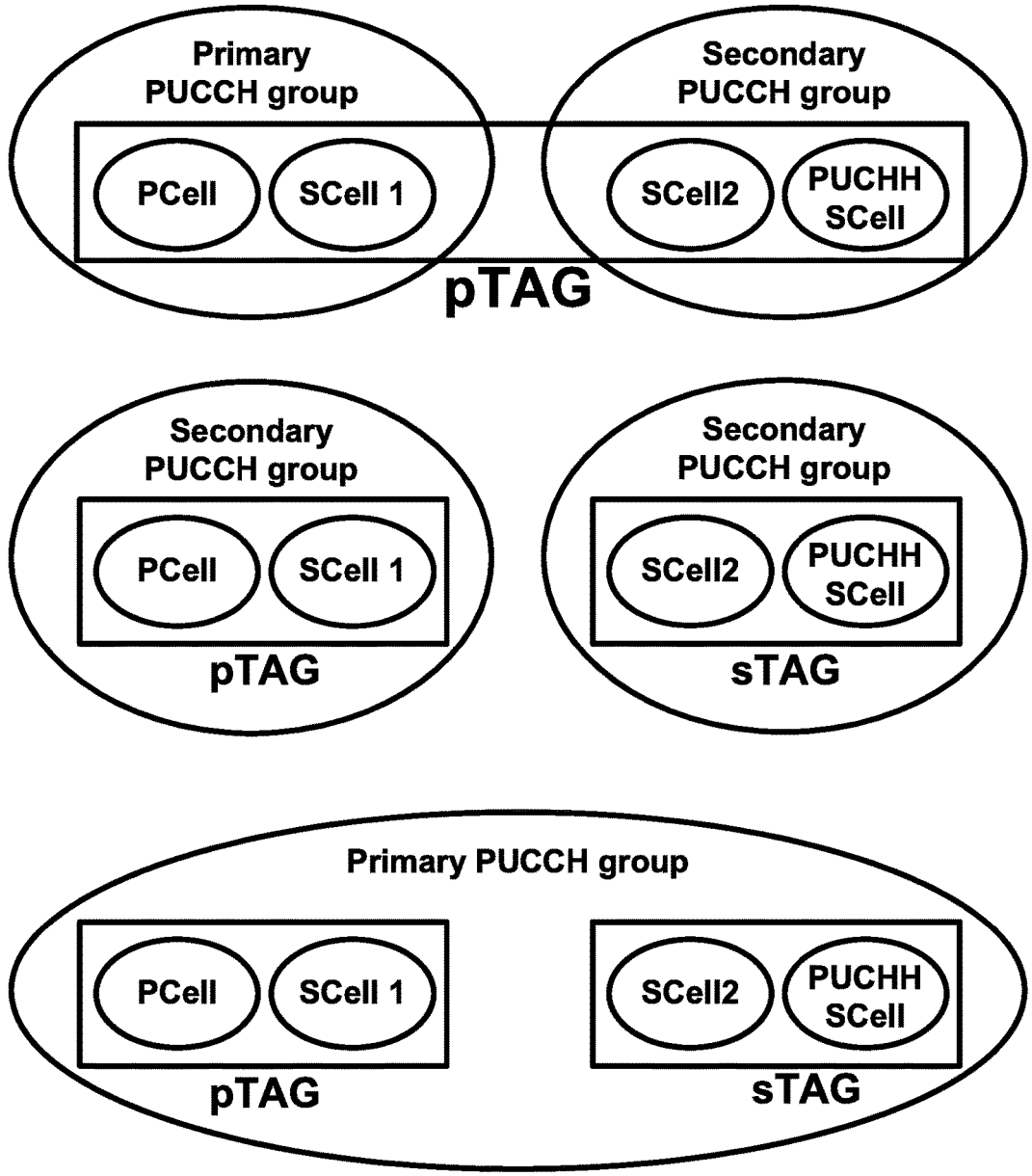
FIG. 11 illustrates example groupings of cells into one or more PUCCH groups and one or more TAGs as per an aspect of an embodiment of the present invention.
Figure 12:
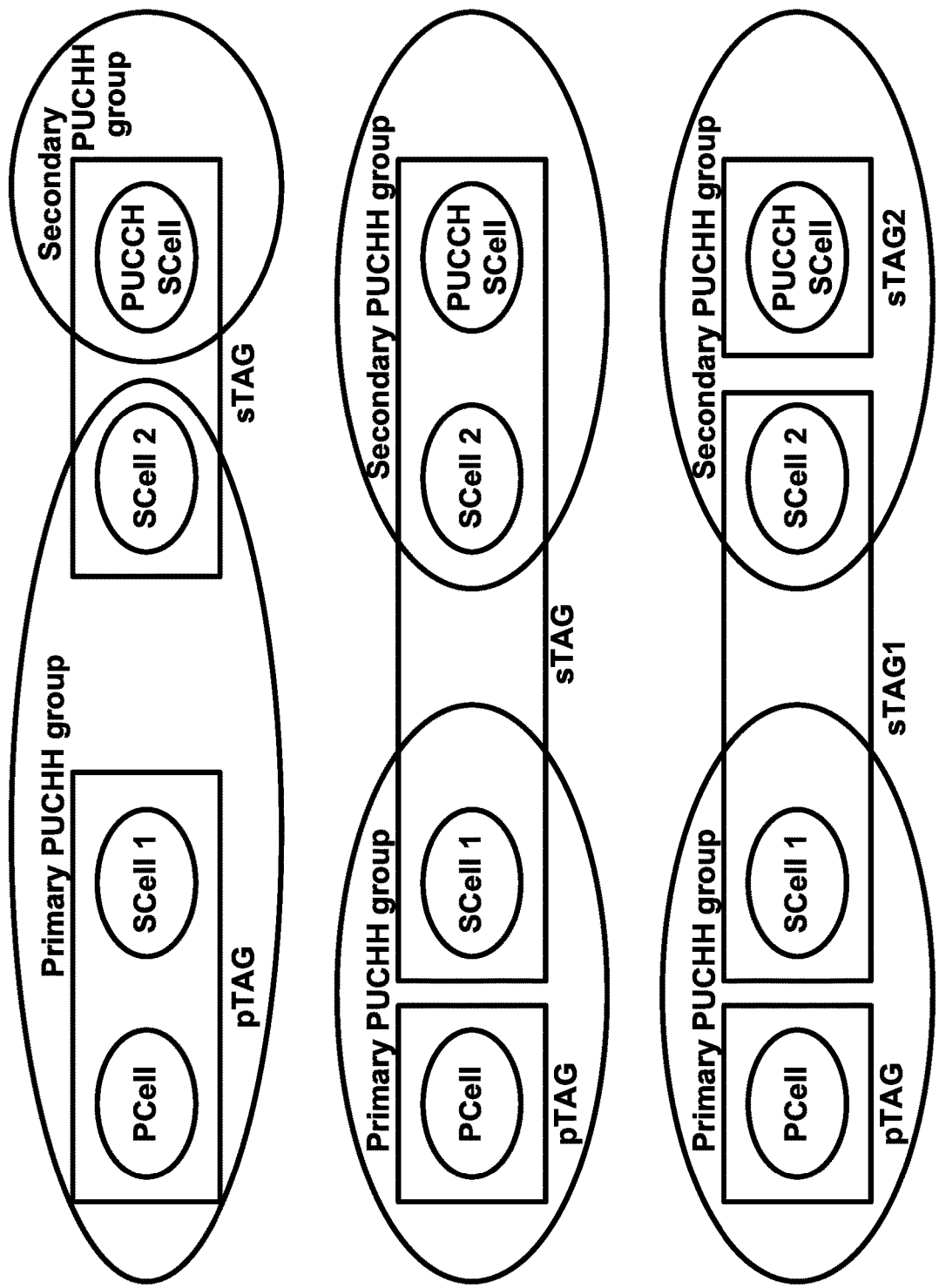
FIG. 12 illustrates example groupings of cells into one or more PUCCH groups and one or more TAGs as per an aspect of an embodiment of the present invention.

In an example embodiment, independent configuration of PUCCH groups and TAGs may be supported. FIG. 11 and FIG. 12 show example configurations of TAGs and PUCCH groups. For example, one TAG may contain multiple serving cells with a PUCCH. For example, each TAG may only comprise cells of one PUCCH group. For example, a TAG may comprise the serving cells (without a PUCCH) which belong to different PUCCH groups.

There may not be a one-to-one mapping between TAGs and PUCCH groups. For example, in a configuration, a PUCCH SCell may belong to primary TAG. In an example implementation, the serving cells of one PUCCH group may be in different TAGs and serving cells of one TAG may be in different PUCCH groups. Configuration of PUCCH groups and TAGs may be left to eNB implementation. In another example implementation, restriction(s) on the configuration of a PUCCH cell may be specified. For example, in an example embodiment, cells in a given PUCCH group may belong to the same TAG. In an example, an sTAG may only comprise cells of one PUCCH group. In an example, one-to-one mapping between TAGs and PUCCH groups may be implemented. In implementation, cell configurations may be limited to some of the examples. In other implementations, some or all the below configurations may be allowed.

In an example embodiment, for an SCell in a pTAG, the timing reference may be a PCell. For an SCell in an sTAG, the timing reference may be any activated SCell in the sTAG. For an SCell (configured with PUCCH or not) in a pTAG, a pathloss reference may be configured to be a PCell or an SIB-2 linked SCell. For an SCell in a sTAG, the pathloss reference may be the SIB-2 linked SCell. When a TAT associated with a pTAG is expired, the TAT associated with sTAGs may be considered as expired. When a TAT of an sTAG containing PUCCH SCell expires, the MAC may indicate to an RRC to release PUCCH resource for the PUCCH group. When the TAT of an sTAG containing a PUCCH SCell is not running, the uplink transmission (PUSCH) for SCells in the secondary PUCCH group not belonging to the sTAG including the PUCCH SCell may not be impacted. The TAT expiry of an sTAG containing a PUCCH SCell may not trigger TAT expiry of other TAGs to which other SCells in the same PUCCH group belong. When the TAT associated with sTAG not containing a PUCCH SCell is not running, the wireless device may stop the uplink transmission for the SCell in the sTAG and may not impact other TAGs.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

Example embodiments of the invention may enable operation of multiple PUCCH groups. Other example embodiments may comprise a non-transitory tangible computer readable media comprising instructions executable by one or more processors to cause operation of PUCCH groups. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of PUCCH groups. The device may include processors, memory, interfaces, and/or the like. Other example embodiments may comprise communication networks comprising devices such as base stations, wireless devices (or user equipment: UE), servers, switches, antennas, and/or the like. In an example embodiment one or more TAGs may be configured along with PUCCH group configuration.

Figure 13:
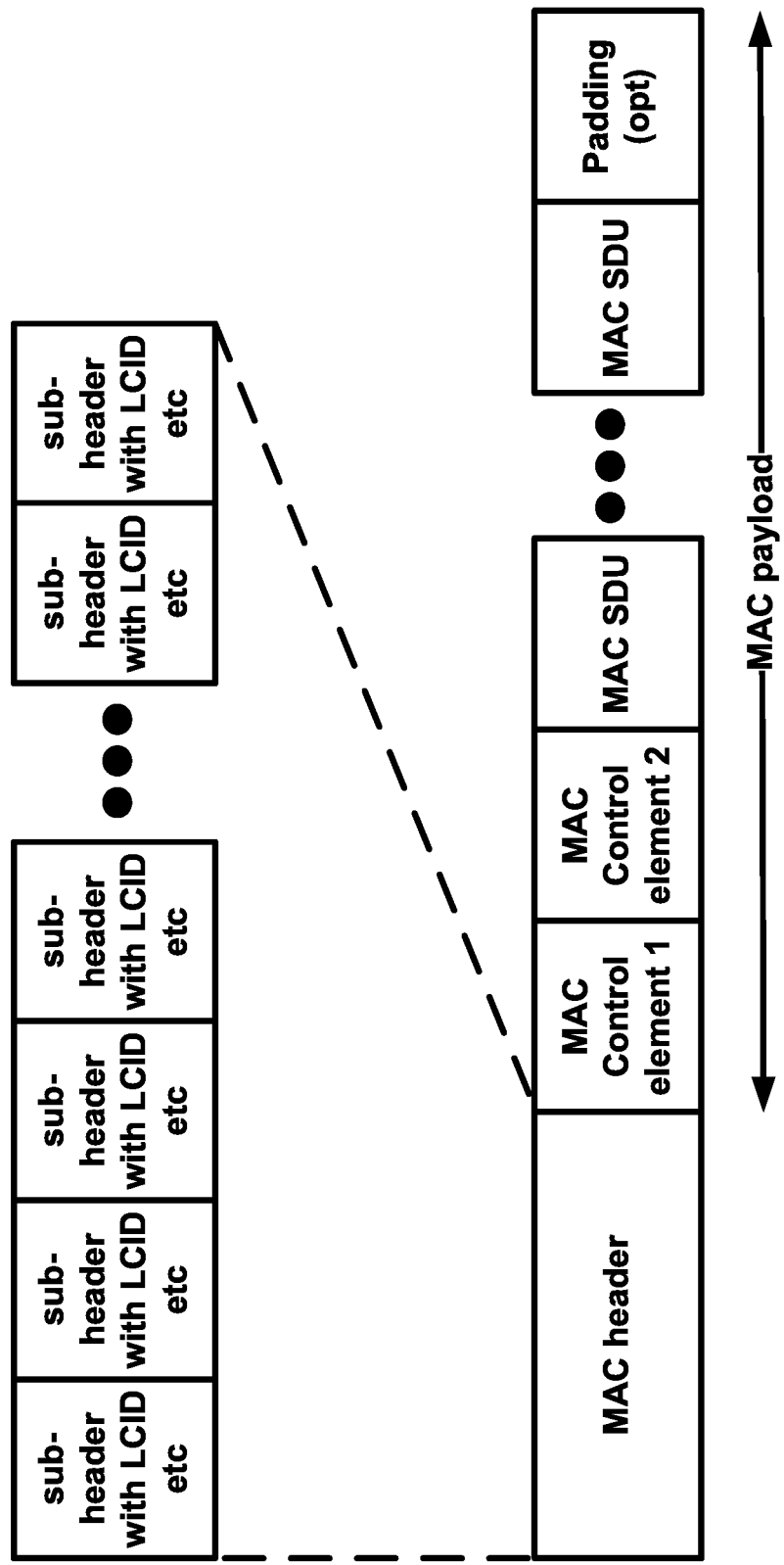
FIG. 13 is an example MAC PDU as per an aspect of an embodiment of the present invention.

FIG. 13 is an example MAC PDU as per an aspect of an embodiment of the present invention. In an example embodiment, a MAC PDU may comprise of a MAC header, zero or more MAC Service Data Units (MAC SDU), zero or more MAC control elements, and optionally padding. The MAC header and the MAC SDUs may be of variable sizes. A MAC PDU header may comprise one or more MAC PDU subheaders. A subheader may correspond to either a MAC SDU, a MAC control element or padding. A MAC PDU subheader may comprise header fields R, F2, E, LCID, F, and/or L. The last subheader in the MAC PDU and subheaders for fixed sized MAC control elements may comprise the four header fields R, F2, E, and/or LCID. A MAC PDU subheader corresponding to padding may comprise the four header fields R, F2, E, and/or LCID.

In an example embodiment, LCID or Logical Channel ID field may identify the logical channel instance of the corresponding MAC SDU or the type of the corresponding MAC control element or padding. There may be one LCID field for a MAC SDU, MAC control element or padding included in the MAC PDU. In addition to that, one or two additional LCID fields may be included in the MAC PDU when single-byte or two-byte padding is required but cannot be achieved by padding at the end of the MAC PDU. The LCID field size may be, e.g. 5 bits. L or the Length field may indicate the length of the corresponding MAC SDU or variable-sized MAC control element in bytes. There may be one L field per MAC PDU subheader except for the last subheader and subheaders corresponding to fixed-sized MAC control elements. The size of the L field may be indicated by the F field and F2 field. The F or the Format field may indicate the size of the Length field. There may be one F field per MAC PDU subheader except for the last subheader and subheaders corresponding to fixed-sized MAC control elements and expect for when F2 is set to 1.

The size of the F field may be 1 bit. In an example, if the F field is included, and/or if the size of the MAC SDU or variable-sized MAC control element is less than 128 bytes, the value of the F field is set to 0, otherwise it is set to 1. The F2 or the Format2 field may indicate the size of the Length field. There may be one F2 field per MAC PDU subheader. The size of the F2 field may be 1 bit. In an example, if the size of the MAC SDU or variable-sized MAC control element is larger than 32767 bytes and if the corresponding subheader is not the last subheader, the value of the F2 field may be set to 1, otherwise it is set to 0. The E or the Extension field may be a flag indicating if more fields are present in the MAC header or not. The E field may be set to "1" to indicate another set of at least R/F2/E/LCID fields. The E field may be set to "0" to indicate that either a MAC SDU, a MAC control element or padding starts at the next byte. R or reserved bit, set to "0".

MAC PDU subheaders may have the same order as the corresponding MAC SDUs, MAC control elements and padding. MAC control elements may be placed before any MAC SDU. Padding may occur at the end of the MAC PDU, except when single-byte or two-byte padding is required. Padding may have any value and the MAC entity may ignore it. When padding is performed at the end of the MAC PDU, zero or more padding bytes may be allowed. When single-byte or two-byte padding is required, one or two MAC PDU subheaders corresponding to padding may be placed at the beginning of the MAC PDU before any other MAC PDU subheader. In an example, a maximum of one MAC PDU may be transmitted per TB per MAC entity, a maximum of one MCH MAC PDU can be transmitted per TTI.

At least one RRC message may provide configuration parameters for at least one cell and configuration parameters for PUCCH groups. The information elements in one or more RRC messages may provide mapping between configured cells and PUCCH SCells. Cells may be grouped into a plurality of cell groups and a cell may be assigned to one of the configured PUCCH groups. There may be a one-to-one relationship between PUCCH groups and cells with configured PUCCH resources. At least one RRC message may provide mapping between an SCell and a PUCCH group, and PUCCH configuration on PUCCH SCell.

System information (common parameters) for an SCell may be carried in a RadioResourceConfigCommonSCell in a dedicated RRC message. Some of the PUCCH related information may be included in common information of an SCell (e.g. in the RadioResourceConfigCommonSCell). Dedicated configuration parameters of SCell and PUCCH resources may be configured by dedicated RRC signaling using, for example, RadioResourceConfigDedicatedSCell.

The IE PUCCH-ConfigCommon and IE PUCCH-ConfigDedicated may be used to specify the common and the UE specific PUCCH configuration respectively.

In an example, PUCCH-ConfigCommon may include: deltaPUCCH-Shift: ENUMERATED {ds1, ds2, ds3}; nRB-CQI: INTEGER (0 . . . 98); nCS-AN: INTEGER (0 . . . 7); and/or n1PUCCH-AN: INTEGER (0 . . . 2047). The parameter deltaPUCCH-Shift ($\Delta_{shift}^{PUCCH}$), nRB-CQI ($N_{RB}^{(2)}$) nCS-An ($N_{cs}^{(1)}$), and n1PUCCH-AN ($N_{PUCCH}^{(1)}$) may be physical layer parameters of PUCCH.

PUCCH-ConfigDedicated may be employed. PUCCH-ConfigDedicated may include: ackNackRepetition CHOICE{release: NULL, setup: SEQUENCE {repetitionFactor: ENUMERATED {n2, n4, n6, spare1},n1PUCCH-AN-Rep: INTEGER (0 . . . 2047)}, tdd-AckNackFeedback-Mode: ENUMERATED {bundling, multiplexing} OPTIONAL}. ackNackRepetitionj parameter indicates whether ACK/NACK repetition is configured. n2 corresponds to repetition factor 2, n4 to 4 for repetitionFactor parameter ($N_{ANRep}$). n1PUCCH-AN-Rep parameter may be PUCCH, $n_{PUCCH,ANRep}^{(1,p)}$ for antenna port P0 and for antenna port P1. dd-AckNackFeedbackMode parameter may indicate one of the TDD ACK/NACK feedback modes used. The value bundling may correspond to use of ACK/NACK bundling whereas, the value multiplexing may correspond to ACK/NACK multiplexing. The same value may apply to both ACK/NACK feedback modes on PUCCH as well as on PUSCH.

The parameter PUCCH-ConfigDedicated may include simultaneous PUCCH-PUSCH parameter indicating whether simultaneous PUCCH and PUSCH transmissions is configured. An E-UTRAN may configure this field for the PCell when the nonContiguousUL-RA-WithinCC-Info is set to supported in the band on which PCell is configured. The E-UTRAN may configure this field for the PSCell when the nonContiguousUL-RA-WithinCC-Info is set to supported in the band on which PSCell is configured. The E-UTRAN may configure this field for the PUCCH SCell when the nonContiguousUL-RA-WithinCC-Info is set to supported in the band on which PUCCH SCell is configured.

A UE may transmit radio capabilities to an eNB to indicate whether UE support the configuration of PUCCH groups. The simultaneous PUCCH-PUSCH in the UE capability message may be applied to both a PCell and an SCell. Simultaneous PUCCH+PUSCH may be configured separately (using separate IEs) for a PCell and a PUCCH SCell. For example, a PCell and a PUCCH SCell may have different or the same configurations related to simultaneous PUCCH+PUSCH.

The eNB may select the PUCCH SCell among current SCells or candidate SCells considering cell loading, carrier quality (e.g. using measurement reports), carrier configuration, and/or other parameters. From a functionality perspective, a PUCCH Cell group management procedure may include a PUCCH Cell group addition, a PUCCH group release, a PUCCH group change and/or a PUCCH group reconfiguration. The PUCCH group addition procedure may be used to add a secondary PUCCH group (e.g., to add PUCCH SCell and one or more SCells in the secondary PUCCH group). In an example embodiment, cells may be released and added employing one or more RRC messages. In another example embodiment, cells may be released employing a first RRC message and then added employing a second RRC messages.

SCells including PUCCH SCell may be in a deactivated state when they are configured. A PUCCH SCell may be activated after an RRC configuration procedure by an activation MAC CE. An eNB may transmit a MAC CE activation command to a UE. The UE may activate an SCell in response to receiving the MAC CE activation command.

In example embodiments, a timer is running once it is started, until it is stopped or until it expires; otherwise it may not be running A timer can be started if it is not running or restarted if it is running. For example, a timer may be started or restarted from its initial value.

At least one RRC message may provide configuration parameters for at least one cell and configuration parameters for PUCCH groups. The information elements in one or more RRC messages may provide mapping between configured cells and the PUCCH groups. Cells may be grouped into a plurality of PUCCH groups and a cell may be assigned to one of the configured PUCCH groups. There may be a one-to-one relationship between PUCCH groups and cells with configured PUCCH resources. At least one RRC message may provide mapping between an SCell and a PUCCH group and PUCCH configuration on PUCCH SCell.

System information (common parameters) for an SCell may be carried in RadioResourceConfigCommonSCell in a dedicated RRC message. Some of the PUCCH related information may be included in common information of an SCell e.g. in RadioResourceConfigCommonSCell. Dedicated configuration parameters of SCell and PUCCH resources may be configured by dedicated RRC signaling using for example RadioResourceConfigDedicatedSCell.

The eNB may select the PUCCH SCell among current SCells or candidate SCells considering cell loading, carrier quality (e.g. using measurement reports), carrier configuration, and/or other parameters. In an example implementation, a PUCCH group re-association may be achieved by using SCell addition/release procedure to remove an SCell and then add a new SCell associated with another PUCCH group. In an example embodiment, in order to change PUCCH group associated with an SCell, the SCell may be first deactivated and then reconfigured. SCell deactivation is performed by an eNB transmitting a deactivation MAC CE to the UE deactivating the SCell. Reconfiguration of SCell parameters and PUCCH groups may be performed by eNB transmitting one or more RRC messages to the UE.

If no PUCCH group assignment and/or PUCCH configuration on SCell(s) is provided in RRC configuration messages, the SCell(s) may be associated to PCell for PUCCH transmission (be assigned to the primary PUCCH group). If there is no explicit PUCCH configuration and/or PUCCH group configuration for a given SCell, the SCell may belong to the primary PUCCH group. This may ensuring a Release-13 or beyond CA UE would behave like a Release-12 UE in a Release-12 network regarding PUCCH transmission. In an example embodiment, if a first parameter is present in the RRC configuration parameters of a secondary cell, the secondary cell is mapped to the secondary PUCCH group, otherwise the secondary cell is mapped to the primary PUCCH group.

From functionality perspective, PUCCH Cell group management procedure may include PUCCH Cell group addition, PUCCH group release, PUCCH group change and PUCCH group reconfiguration. The PUCCH group addition procedure may be used to add a secondary PUCCH group, e.g., to add a PUCCH SCell and one or more SCells in the secondary PUCCH group.

When PUCCH SCell is released for reconfiguration or other purposes, the eNB may also release cells in that PUCCH group. When PUCCH SCell is released, other cells in the corresponding PUCCH group may not have access to PUCCH resources.

A PUCCH SCell may be in a deactivated state after it is configured. The PUCCH SCell may be activated by an activation MAC CE. Other SCell(s) in this secondary PUCCH group may be in deactivated state after they are configured.

The PUCCH group release procedure may be used to release a secondary PUCCH group. An eNB may release SCells in a PUCCH group when PUCCH group is released. In an example embodiment, SCells in a PUCCH group may be automatically released when the PUCCH group is released. SCells may be reconfigured as a part of the primary PUCCH group. The primary PUCCH group may not be released, and PCell may always include PUCCH resources and at least transmit PCell CSI and HARQ feedback on PUCCH PCell.

In an example embodiment, one or more IEs in one or more RRC messages may be for PUCCH configurations and/or UCI (uplink control information) transmissions of an SCell. An SCell may be assigned a cell index. An RRC message may comprise one or more IEs to configure an SCell and indicate whether UCIs corresponding to the SCell is transmitted on the PUCCH SCell or the PCell. An eNB may transmit one or more RRC messages to configure the SCell and indicate whether the CSI and/or UCIs corresponding to the SCell is transmitted on the PUCCH SCell or the PCell. The one or more RRC messages may comprise one or more IEs indicating whether the CSI and/or UCIs corresponding to the SCell is transmitted on the PUCCH SCell or the PCell. For example, the presence of an IE in an RRC message (e.g. with value of true) may indicate that the SCell is in a secondary PUCCH group. When the IE is false or is not present in SCell configuration parameters, the RRC message may indicate that the SCell is in the primary PUCCH group.

In an example embodiment, one or more RRC messages may comprise new IEs that comprise PUCCH configuration parameters for a PUCCH SCell. For example, the RRC message may comprise PUCCH-ConfigDedicatedSCell (dedicated parameters) and PUCCH-ConfigCommonSCell (common parameters) indicating dedicated and common parameters for the PUCCH SCell.

In an example embodiment, a wireless device may receive at least one message comprising one or more parameters employed for adding, modifying, or releasing one or more secondary cells in a plurality of cells. The wireless device may add, modify or release the one or more secondary cells employing the at least one message. The plurality of cells are grouped into one or more physical uplink control channel (PUCCH) groups.

The at least one message is configurable to cause assignment of a secondary cell to one of the one or more PUCCH groups when the secondary cell is added. The at least one message is configurable to add the secondary cell as a physical uplink control channel (PUCCH) secondary cell with a PUCCH. The at least one message is configurable to cause release of the secondary cell. The at least one message is unconfigurable to cause a modification of the secondary cell (when the secondary cell is already configured) to a PUCCH secondary cell before first releasing the secondary cell. An SCell may be first released if PUCCH is to be configured for the SCell (that is already configured). The SCell may be added with new PUCCH configuration. Configuring PUCCH resources for an already configured SCell that does not include PUCCH may require complicated decoding process in an eNB. The disclosed mechanism may enable orderly configuration of an PUCCH SCell and transmission of UCI on the PUCCH SCell.

The eNB may activate and uplink synchronize (if it is not uplink synchronized) the PUCCH SCell. After PUCCH SCell is activated and uplink synchronized then PUCCH information for the cells in PUCCH group may be transmitted in the uplink.

The plurality of cells configured in a UE may be grouped into a plurality of PUCCH groups. Newly added SCells may be configured as a part of a primary PUCCH group or a secondary PUCCH group. RRC configuration of an SCell may be modified to change the PUCCH group that the SCell belongs to. For example, RRC configuration of an SCell in the primary PUCCH group may be modified and the SCell may be reconfigured as a part of the secondary PUCCH group. In another example, RRC configuration of an SCell in the secondary PUCCH group may be modified and the SCell may be reconfigured as a part of the primary PUCCH group. An eNB may transmit one or more RRC messages to a UE for reconfiguration of PUCCH groups and cells within a PUCCH group.

A UE may maintain the activation status of an SCell when reconfiguring an SCell from a primary PUCCH group to a secondary PUCCH group or from a secondary PUCCH group to a primary PUCCH group. Such mechanism may allow seamless operation of a secondary cell while being reconfigured from one PUCCH group to the other and enables an eNB to balance the load between PUCCH groups without the need for SCell deactivation or SCell RRC release.

In such reconfiguration the SCell may remain in the same timing advance group (TAG). If the SCell was in a primary TAG, the SCell may remain in the same pTAG. If the SCell was in a secondary cell was in a secondary TAG, the SCell may remain in the same sTAG. Changing the TAG of the SCell may require the UE to release the SCell and add the SCell as a part of the new TAG. Changing PUCCH group of the SCell may not necessarily require deactivation or release of the SCell.

In an example embodiment, an SCell may be initially a part of the primary PUCCH group. The UE may transmit CSI of the SCell on the PUCCH resources of the primacy cell. The UE may receive an RRC reconfiguration message modifying CSI transmission resources for the SCell to a PUCCH SCell. The UE may stop transmission of CSI on CSI resources on the primary cell and start transmission of the CSI on CSI resources of the PUCCH SCell. The measurement resources of the SCell (CRS, or CSI RS) may or may not change during the SCell reconfiguration. The measurement transmission resource and parameters may be modified. During this process, the UE may maintains uplink synchronization of the SCell. There may not be a timing change or jitter in the uplink transmissions for the SCell. The UE may not need to deactivate or release the SCell in order to transmit on the updated PUCCH resources. It is assumed that the PUCCH SCell maintains its uplink synchronization when the UE modifies SCell CSI transmission resource configuration. In another example, one or more configuration parameters of an SCell in a secondary PUCCH group may be modified and the SCell may become a member of the primary PUCCH group without being deactivated during PUCCH group modification process.

Releasing or deactivating the SCell when PUCCH group of the SCell and CSI transmission resources are modified may result in additional delay in SCell operations. The SCell may not be able to transmit and receive packets when it is deactivated or released. In an example embodiment, the UE may apply the new CSI transmission parameters to CSI measurement and transmit CSI in the new resources. This processing period for applying the new parameters may be in the range of a few subframes. The UE may be able to transmit and receive packets during this period. Even if the UE does not receive or transmit information during this period, this period of inactivity may be much shorter than deactivation/activation period or cell-release/cell-add period. It may be advantageous to maintain SCell activation status when PUCCH group of an SCell is modified.

In an example embodiment, a wireless device may transmit channel state information (CSI) fields of a secondary cell on a first cell. The wireless device may receive, in subframe n, an RRC message comprising one or more configuration parameters of the secondary cell. The one or more configuration parameters may indicate CSI transmission resources for the secondary cell. The CSI transmission resources may be on a second cell different from the first cell. The wireless device may stop, in subframe n+p, transmission of CSI fields of the secondary cell on the first cell, wherein p is a number greater than one. The wireless device may start, in subframe n+k, transmitting CSI fields of the secondary cell on the second cell, wherein k is a number greater than or equal to p. The secondary cell may maintain activation status after receiving the message and at least until subframe n+k.

In an example embodiment of the invention, a wireless device may receive a first message comprising one or more first configuration parameters indicating first channel state information (CSI) transmission resources for the secondary cell. The first CSI transmission resources may be on a first cell in the plurality of cells. The wireless device may transmit CSI fields of the secondary cell on the first cell. The wireless device may receive, in subframe n, a second message indicating second CSI transmission resources for the secondary cell. The CSI transmission resources may be on a second cell different from the first cell. The wireless device may stop, in subframe n+p, transmission of CSI fields of the secondary cell on the first cell, wherein p is a number greater than one. The wireless device may start, in subframe n+k, transmitting CSI fields of the secondary cell on the second cell, wherein k is a number greater than or equal to p. In an example embodiment k is a number greater than or equal to p+s, wherein s is greater than or equal to 1. The secondary cell maintains activation status after receiving the second message and at least until subframe n+k. In an example embodiment, the secondary cell may be the first cell. In an example embodiment, the secondary cell is the second cell. In an example embodiment, the secondary cell is different from the first cell and the second cell.

When a PUCCH SCell is released for reconfiguration or other purposes, the eNB may release other cell(s) in the corresponding secondary PUCCH group. When PUCCH SCell is released (and no other PUCCH SCell is configured), other cells in the corresponding PUCCH group may not have access to PUCCH resources. The eNB may release other SCells in the PUCCH group when the corresponding PUCCH SCell is released. In an example embodiment, UE may autonomously release other SCells in the PUCCH group when the corresponding PUCCH SCell is released. For example, a UE may release other SCells in the PUCCH group when the corresponding PUCCH SCell is released without the eNB explicitly indicating release of the other SCells in an RRC message. When the PUCCH SCell is released the UE may not be able to transmit CSI and ACK/NACK information in the uplink and may not be able to receive any downlink transport blocks from the eNB. In such a scenario, the release of other cells in the UE may reduce battery power consumption in a UE.

In an example embodiment, a wireless device receives at least one RRC message comprising configuration parameters of a plurality of cells. The plurality of cells may be grouped into a plurality of physical uplink control channel (PUCCH) groups comprising: a primary PUCCH group comprising a primary cell with a primary PUCCH transmitted to the base station; and a secondary PUCCH group comprising a first plurality of secondary cells in the plurality of cells. The first plurality of secondary cells comprises a PUCCH secondary cell with a secondary PUCCH transmitted to the base station. The wireless device may receive a second message comprising one or more parameters indicating a release of the PUCCH secondary cell. The wireless device may release each of the first plurality of secondary cells in the secondary PUCCH group.

When PUCCH SCell is reconfigured and no longer belongs to the secondary PUCCH group and/or when PUCCH SCell is reconfigured and no longer includes a PUCCH (an no other SCell in the secondary PUCCH group includes PUCCH), the eNB may release other cell(s) in that secondary PUCCH group. When PUCCH SCell is reconfigured and does not include PUCCH (and no other PUCCH SCell is configured) or when PUCCH SCell is reconfigured and does not belong to the PUCCH group, other cells in the corresponding PUCCH group may not have access to PUCCH resources. The eNB may release other SCells in the PUCCH group when the corresponding PUCCH is not available. In an example embodiment, UE may autonomously release other SCells in the PUCCH group when the corresponding PUCCH is not available. For example, UE may release other SCells in the PUCCH group when the corresponding PUCCH is not available without eNB explicitly indicating release of the other SCells in an RRC message. When the PUCCH is not available (e.g. due to RRC reconfiguration), the UE may not be able to transmit CSI and ACK/NACK information in the uplink and may not be able to receive any downlink transport blocks from the eNB. In such a scenario, the release of other cells in the UE may reduce battery power consumption in the UE.

In an example embodiment, a wireless device may receive at least one RRC message comprising configuration parameters of a plurality of cells. The plurality of cells may be grouped into a plurality of physical uplink control channel (PUCCH) groups comprising: a primary PUCCH group comprising a primary cell with a primary PUCCH transmitted to the base station; and a secondary PUCCH group comprising a first plurality of secondary cells in the plurality of cells. The first plurality of secondary cells comprises a PUCCH secondary cell with a secondary PUCCH transmitted to the base station. The wireless device may receive a second message comprising one or more parameters indicating at least one of the following: a release of the PUCCH secondary cell; a reconfiguration of the PUCCH secondary cell to another PUCCH group when no other PUCCH SCell is configured for the PUCCH group; and/or reconfiguration of PUCCH secondary cell to a cell without PUCCH when no other PUCCH SCell is configured for the PUCCH group. The wireless device may release each of the first plurality of secondary cells in the secondary PUCCH group.

The PUCCH group release procedure may be used to release a secondary PUCCH group. An eNB may release SCell(s) in a PUCCH group when PUCCH group is released. In an example embodiment, SCells in a PUCCH group may be automatically and/or autonomously released when the PUCCH group is released. SCells may be reconfigured as a part of the primary PUCCH group by eNB. This process may reduce the signaling needs required for releases each individual SCell in a PUCCH group. The eNB and the UE may release SCells in a PUCCH group when an RRC message indicates the release of the PUCCH group. In such a scenario, the release of other cells in the UE may reduce battery power consumption in a UE.

Primary PUCCH group may not be released, since PCell may include PUCCH resources and at least transmit PCell CSI and HARQ feedback on PUCCH PCell. In an example embodiment, if the primary PUCCH group is released the connection of a UE with the base station may be released.

In an example embodiment of the invention, a wireless device may receive at least one message comprising configuration parameters of a plurality of cells. The plurality of cells may be grouped into a plurality of physical uplink control channel (PUCCH) groups comprising: a primary PUCCH group comprising a primary cell with a primary PUCCH transmitted to the base station; and a secondary PUCCH group comprising a first plurality of secondary cells in the plurality of cells. The first plurality of secondary cells may comprise a PUCCH secondary cell with a secondary PUCCH transmitted to the base station. The wireless device may receive a second message comprising one or more parameters indicating a release of the secondary PUCCH group. The wireless device may release each of the first plurality of secondary cells in the secondary PUCCH group.

In Release-12, PCell supports RLM for CA, and PCell and PSCell support RLM for DC. PUCCH SCell may or may not support RLM depending on eNB and UE implementations. In an example embodiment, a PUCCH SCell may not support RLM. A PUCCH SCell radio link issues may be detected by the eNB based on CQI/SRS reporting and/or RRM measurement reports for the PUCCH SCell. E-UTRAN (e.g. eNB) may handle loss of SCell(s) e.g. using CQI reporting or regular RRM reporting.

When a PUCCH SCell link has issues e.g. loses downlink signals, observes high error rates and/or interference, it may not be possible to perform downlink transmissions on SCells of the corresponding PUCCH group due to missing CSI/HARQ feedback channel. In an example embodiment, a UE and an eNB implementation may implement failure indication for an PUCCH SCell. For example, the UE may transmit a control message, for example a failure indication, to the eNB in case there is a RLF (or other failure) in the PUCCH SCell. Transmission of PUCCH SCell failure indication from the UE to the eNB may avoid or reduce unnecessary UL interference from the UE, and may reduce delays of reconfiguring or releasing cell configurations, for example reconfiguring or releasing cells in the PUCCH groups.

In an example embodiment, when a UE determines issues with a PUCCH SCell, the UE may avoid UL transmissions on the PUCCH SCell in order to reduce UL interference. The UE may stop UL transmissions on PUCCH SCell if the UE detects radio link issues with the PUCCH SCell. In an example embodiment, the PUCCH SCell and/or SCells in the PUCCH group may be deactivated when there are issues with the PUCCH SCell.

In an example embodiment, an eNB may detect issues with PUCCH SCell radio link. The eNB may detect radio link issues with PUCCH SCell link for example when eNB loses PUCCH SCell signals, observes high error rates and/or interference on PUCCH SCell, observes CQI feedback indicating poor signal quality on PUCCH SCell, or receives measurement reports indicating poor signal quality on PUCCH SCell. Poor and acceptable signal quality levels depends on radio link monitoring criteria. For example, if the received signal level is below certain threshold (e.g. −110 dBm), the signal may be considered having poor quality. In an example, when the eNB or UE loses synchronization with the received signal for a sustained period of time, the signal may be considered unacceptable. In an example, if the signal power or SINR is above certain threshold (e.g. −100 dB) the signal may be considered acceptable. Other metric and more complex algorithms may be employed to determine is the signal quality is acceptable or not acceptable.

In an example, the eNB may detect radio link issues when a UE indicates radio link issues with PUCCH SCell for example by transmitting a link failure message to the eNB. A UE may transmit failure indication for example when the UE cannot measure pathloss reference of the downlink carrier of an PUCCH SCell.

In an example embodiment, the eNB may deactivate serving cells in the corresponding PUCCH group when the eNB detects radio link issues with the PUCCH SCell in the PUCCH group. The eNB may deactivate the cells in PUCCH group by transmitting a MAC deactivation MAC CE to the UE. The disclosed embodiment may reduce interference in the network. A PUCCH SCell carries CSI and HARQ feedback information for downlink carriers of cells in the PUCCH group. When PUCCH SCell is not available, the UE may not be able to receive downlink information.

In an example embodiment, the eNB may release serving cells in the corresponding PUCCH group when the eNB detects radio link issues with the PUCCH SCell in the PUCCH group. The eNB may release the cells in PUCCH group by transmitting at least one RRC message (e.g. an RRC connection reconfiguration message) to the UE releasing the cells in PUCCH group. In an example, the eNB may reconfigure/add some or all of those cells by the same at least one RRC message. In an example, the eNB may reconfigure/add some or all of those cells by transmitting one or more RRC messages. The disclosed embodiment may reduce interference in the network. PUCCH SCell carries CSI and HARQ feedback information for downlink carriers of cells in the PUCCH group. When PUCCH SCell is not available, the UE may not be able to receive downlink information. When cells are released the UE may not transmit and receive signals on the released cells. The eNB may reconfigure the cells and/or PUCCH groups. An eNB may configure PUCCH on another cell with an acceptable radio link quality.

In an example embodiment, when the UE detects radio link issues with the PUCCH SCell, the UE may transmit a failure indication to the eNB. In an example embodiment, when the UE detects radio link issues with the PUCCH SCell, the UE may autonomously deactivate the PUCCH SCell.

In an example embodiment, when the UE detects radio link issues with the PUCCH SCell, the UE may not transmit signals on PUCCH SCell control information in the uplink PUCCH for the SCells in the corresponding PUCCH group. Other activated SCell(s) in a PUCCH group corresponding to the PUCCH SCell (with radio link issue) may not transmit uplink CQI/PMI/RI/PTI/HARQ-feedback reporting on PUCCH of the the PUCCH SCell. In an example embodiment, in such a scenario, the UE may be able to receive uplink grants and transmit uplink packets to the eNB, but may stop receiving DL-SCH packets. The UE may be able to receive downlink HARQ and downlink physical control channels (e.g. PBCCH, PCFICH, PDCCH, and/or ePDCCH) and/or broadcast channel on the SCell. The UE may not be able to provide downlink feedback information (e.g. CQI/PMI/RI/PTI/HARQ-feedback) on the PUCCH SCell (with radio link issue).

In an example embodiment, when UE detects radio link issues with PUCCH SCell, UE may clear any configured downlink assignments received for the SCells in the corresponding PUCCH group. UE may clear any HARQ processes for downlink packets in the corresponding PUCCH group.

Figure 14:
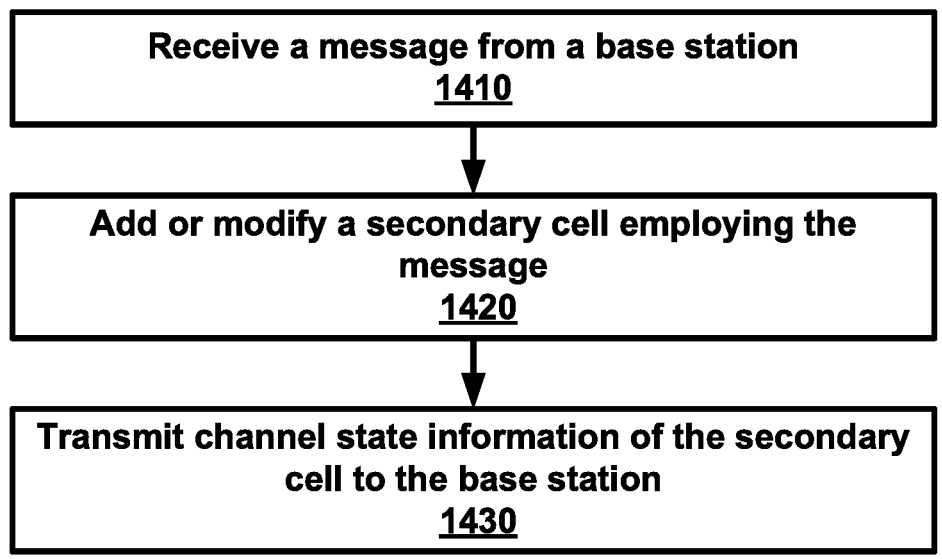
FIG. 14 is an example flow diagram as per an aspect of an embodiment of the present invention.

FIG. 14 is an example flow diagram as per an aspect of an embodiment of the present invention. A wireless device receives at least one message from a base station at 1410. The message may comprise one or more parameters for adding and/or modifying a secondary cell in a plurality of cells. According to an embodiment, the one or more parameters may comprise: a plurality of common parameters, and/or a plurality of dedicated parameters. According to an embodiment, the message may comprise configuration parameters for the plurality of cells. The plurality of cells may be grouped into a plurality of PUCCH groups. The plurality of PUCCH groups may comprise: a primary PUCCH group, and/or a secondary PUCCH group. The primary PUCCH group may comprise a primary cell with a primary PUCCH transmitted to the base station. The secondary PUCCH group may comprise the PUCCH secondary cell with the secondary PUCCH transmitted to the base station.

The secondary cell may be added and/or modified employing the message at 1420. According to an embodiment, the secondary cell may be deactivated when it is added.

The message may be configurable to add the secondary cell as a physical uplink control channel (PUCCH) secondary cell with a PUCCH. The message may also be unconfigurable to cause modification of the secondary cell to the PUCCH secondary cell before first releasing the secondary cell when the secondary cell is already configured.

Channel state information of the secondary cell may be transmitted to the base station at 1430. According to an embodiment, the channel state information may comprise a precoding matrix indicator, a rank indicator, and/or a channel quality indicator.

According to an embodiment, a second message configured to cause the release of the secondary cell in the wireless device may be received. The secondary cell may be the PUCCH secondary cell. A third message configured to cause the addition of the secondary cell with no PUCCH resources may also be received. According to an embodiment, a second message configured to cause the release of the secondary cell in the wireless device may be received by the wireless device. The secondary cell may have no PUCCH resources. A third message configured to cause the addition of the secondary cell with PUCCH resources may be received.

Figure 15:
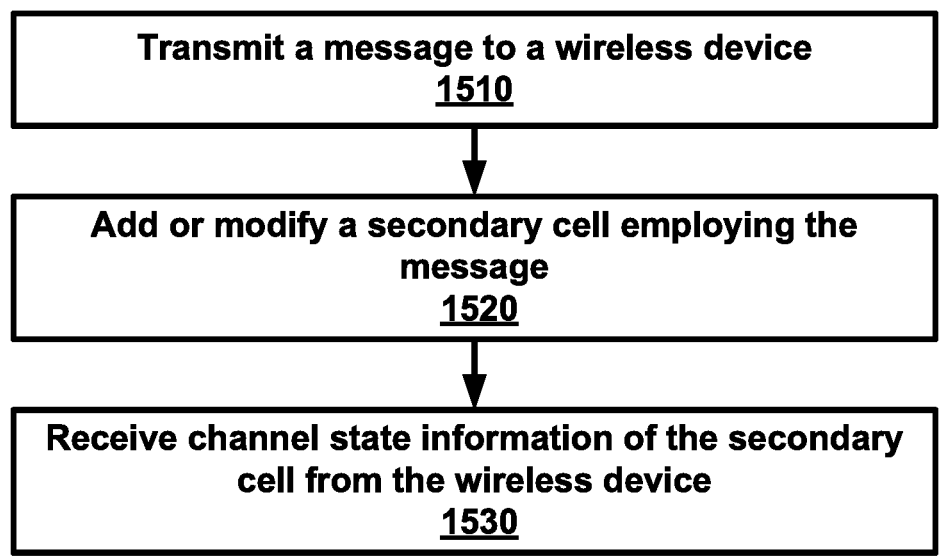
FIG. 15 is an example flow diagram as per an aspect of an embodiment of the present invention.

FIG. 15 is an example flow diagram as per an aspect of an embodiment of the present invention. A base station transmits at least one message to a wireless device at 1510. The message may comprise a message comprising one or more parameters for adding and/or modifying a secondary cell in a plurality of cells. According to an embodiment, the one or more parameters may comprise: a plurality of common parameters, and/or a plurality of dedicated parameters. According to an embodiment, the message may comprise configuration parameters for the plurality of cells. The plurality of cells may be grouped into a plurality of PUCCH groups. The plurality of PUCCH groups may comprise: a primary PUCCH group, and/or a secondary PUCCH group. The primary PUCCH group may comprise a primary cell with a primary PUCCH transmitted to the base station. The secondary PUCCH group may comprise the PUCCH secondary cell with the secondary PUCCH transmitted to the base station.

At 1520, the secondary cell employing the message may be added and/or modified. The message may be configurable to add the secondary cell as a physical uplink control channel (PUCCH) secondary cell with a PUCCH. The message may be unconfigurable to cause modification of the secondary cell to the PUCCH secondary cell before first releasing the secondary cell when the secondary cell is already configured. According to an embodiment, the secondary cell may be deactivated when it is added.

Channel state information of the secondary cell may be received from the wireless device at 1530. According to an embodiment, the channel state information may comprise a precoding matrix indicator, a rank indicator, and/or a channel quality indicator.

According to an embodiment, a second message configured to cause the release of the secondary cell in the wireless device may be transmitted. The secondary cell may be the PUCCH secondary cell. A third message configured to cause the addition of the secondary cell with no PUCCH resources may be transmitted. According to an embodiment, a second message configured to cause the release of the secondary cell in the wireless device may be transmitted. The secondary cell may have no PUCCH resources. A third message configured to cause the addition of the secondary cell with PUCCH resources may be transmitted.

Figure 16:
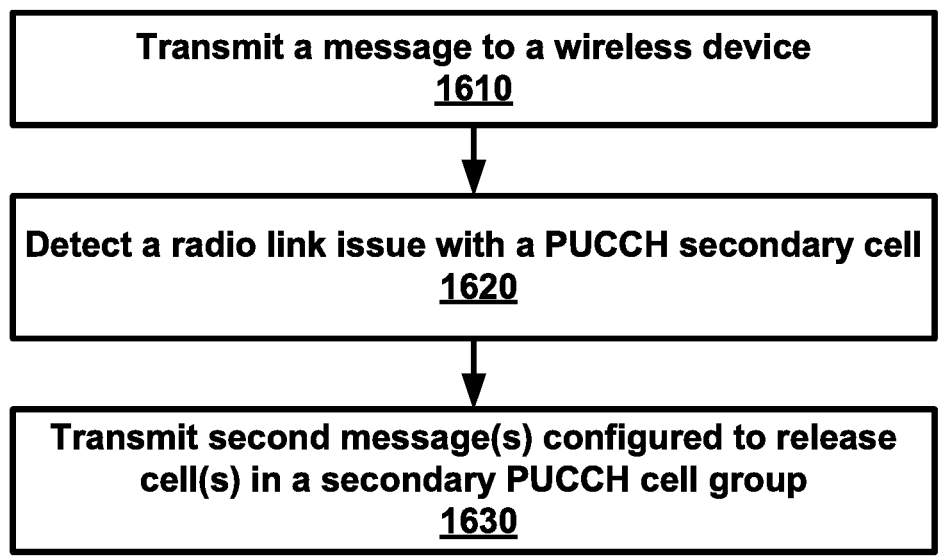
FIG. 16 is an example flow diagram as per an aspect of an embodiment of the present invention.

FIG. 16 is an example flow diagram as per an aspect of an embodiment of the present invention. A base station transmits at least one message to a wireless device at 1610. The message may comprise at least one first message. The at least one first message may comprise configuration parameters of a plurality of cells. The plurality of cells may be grouped into a plurality of physical uplink control channel (PUCCH) groups. The PUCCH) cell groups may comprise a primary PUCCH group and/or a secondary PUCCH group. The primary PUCCH group may comprise a primary cell with a primary PUCCH received by the base station. The secondary PUCCH group may comprise a PUCCH secondary cell with a secondary PUCCH received by the base station. According to an embodiment, the configuration parameters may comprise a plurality of common parameters, and/or a plurality of dedicated parameters.

A radio link issue with the PUCCH secondary cell may be detected at 1620 while one or more other cells in the secondary PUCCH group have acceptable radio link quality. At least one second message configured to release at least one of the one or more other cells in the secondary PUCCH group may be transmitted at 1630. According to an embodiment, the at least one second message may be further configured to release the PUCCH secondary cell. According to an embodiment, the transmission of at least one second message may comprise at least one cell index of the at least one of the one or more other cells.

According to an embodiment, the detection of the radio link issue may employ detecting a loss of PUCCH secondary cell signals. the detection of the radio link issue may employ detecting a loss of synchronization with the PUCCH secondary cell signals. The detection of the radio link issue may employ measuring high error rates on the PUCCH secondary cell. The radio link issue may be detected employing measuring high interference on the PUCCH secondary cell. The radio link issue may be detected employing the reception of a channel quality indicator (CQI) feedback indicating poor signal quality on the PUCCH secondary cell. The radio link issue may be detected employing the reception of measurement reports indicating poor signal quality on the PUCCH secondary cell. According to an embodiment, the detection of the radio link issue may occur when the base station receives a third message from the wireless device.

Figure 17:
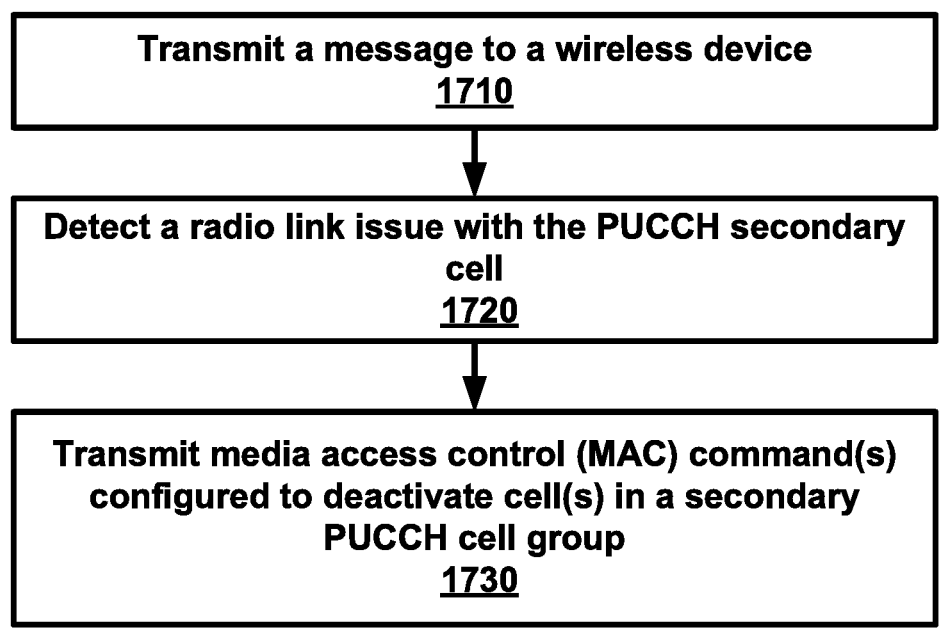
FIG. 17 is an example flow diagram as per an aspect of an embodiment of the present invention.

FIG. 17 is an example flow diagram as per an aspect of an embodiment of the present invention. A base station transmits at least one message to a wireless device at 1710. The at least one first message may comprise configuration parameters of a plurality of cells. The plurality of cells may be grouped into a plurality of physical uplink control channel (PUCCH) groups. The PUCCH groups may comprise a primary PUCCH group, and/or a secondary PUCCH group. The primary PUCCH group may comprise a primary cell with a primary PUCCH received by the base station. The secondary PUCCH group may comprise a PUCCH secondary cell with a secondary PUCCH received by the base station. According to an embodiment, the configuration parameters may comprise a plurality of common parameters. The configuration parameters may comprise a plurality of dedicated parameters.

A radio link issue with the PUCCH secondary cell may be detected while one or more other cells in the secondary PUCCH group have acceptable radio link quality at 1720. According to an embodiment, the detection of the radio link issue may employ detecting a loss of PUCCH secondary cell signals. The detection of the radio link issue may employ detecting a loss of synchronization with the PUCCH secondary cell signals. The detection of the radio link issue may employ measuring high error rates on the PUCCH secondary cell. According to an embodiment, the detection of the radio link issue may employ measuring high interference on the PUCCH secondary cell. The detection of the radio link issue may employ receiving a channel quality indicator (CQI) feedback indicating poor signal quality on the PUCCH secondary cell. The detection of the radio link issue may employ receiving measurement reports indicating poor signal quality on the PUCCH secondary cell. According to an embodiment, the detection of the radio link issue may occur when the base station receives a third message from the wireless device.

At least one second media access control (MAC) command configured to deactivate at least one of the one or more other cells in the secondary PUCCH group may be transmitted at 1730. According to an embodiment, at least one second MAC command may be further configured to deactivate the PUCCH secondary cell. According to an embodiment, the transmission of the at least one second MAC command may comprise a bitmap indicating deactivation of the at least one of the one or more other cells.

Figure 18:
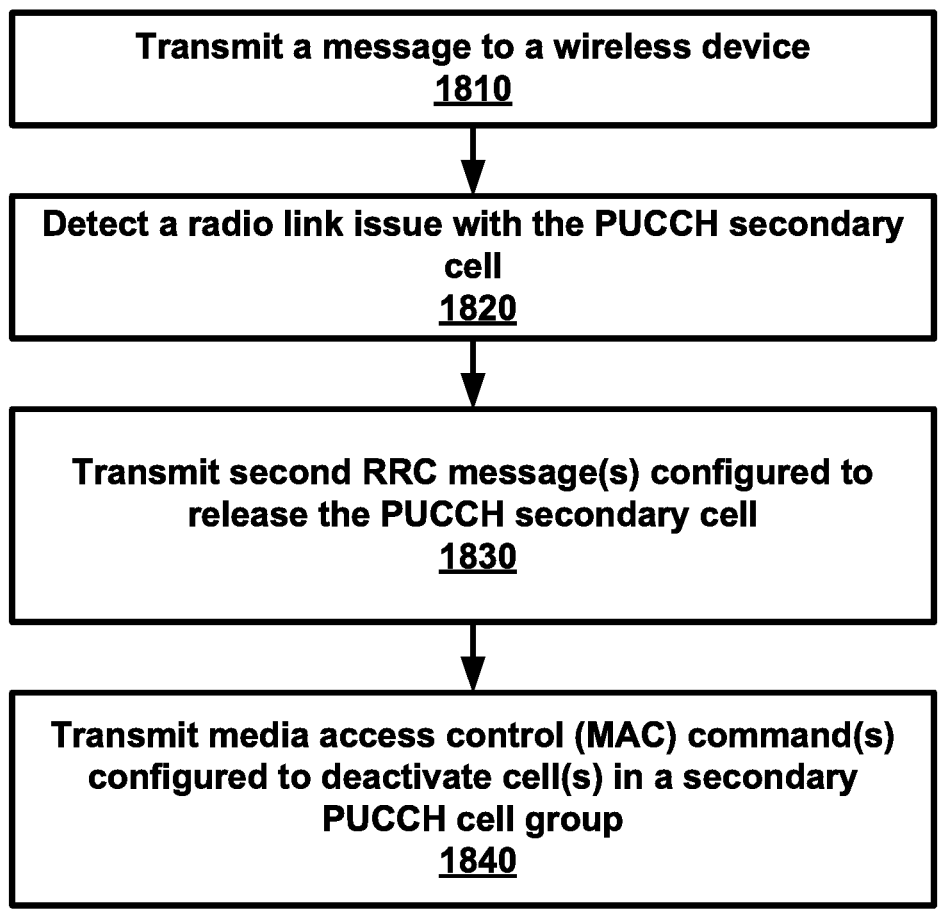
FIG. 18 is an example flow diagram as per an aspect of an embodiment of the present invention.

FIG. 18 is an example flow diagram as per an aspect of an embodiment of the present invention. A base station transmits at least one message to a wireless device at 1810. The at least one first message may comprise configuration parameters of a plurality of cells. The plurality of cells may be grouped into a plurality of physical uplink control channel (PUCCH) groups. The PUCCH groups may comprise a primary PUCCH group, and/or a secondary PUCCH group. The primary PUCCH group may comprise a primary cell with a primary PUCCH received by the base station. The secondary PUCCH group may comprise a PUCCH secondary cell with a secondary PUCCH received by the base station. According to an embodiment, the configuration parameters may comprise a plurality of common parameters. The configuration parameters may comprise a plurality of dedicated parameters. A radio link issue with the PUCCH secondary cell may be detected at 1820 while one or more other cells in the secondary PUCCH group has acceptable radio link quality. At least one second RRC message configured to release the PUCCH secondary cell may be transmitted at 1830. At least one second MAC command configured to deactivate at least one of the one or more other cells in the secondary PUCCH group may be transmitted at 1840.

Figure 19:
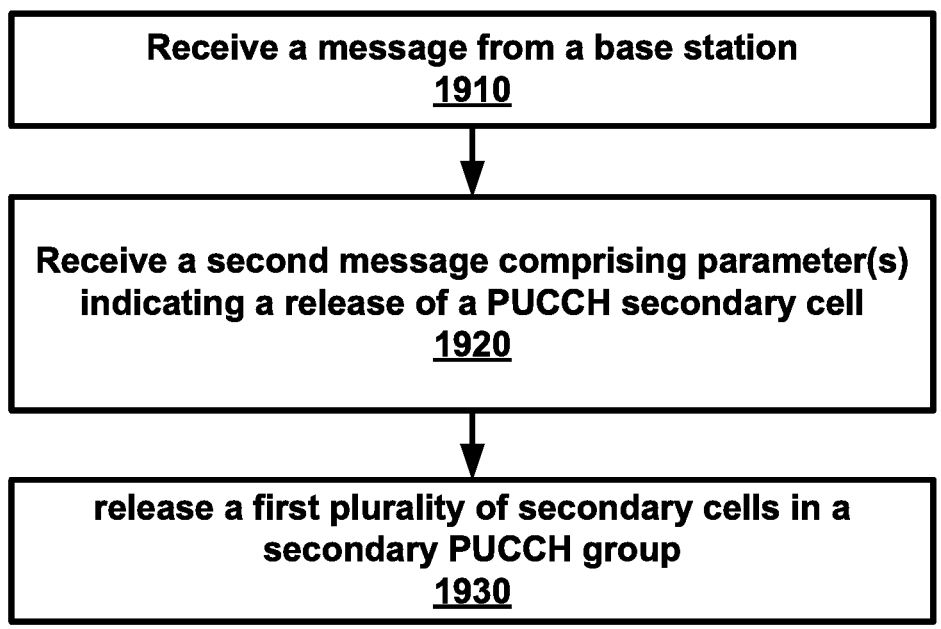
FIG. 19 is an example flow diagram as per an aspect of an embodiment of the present invention.

FIG. 19 is an example flow diagram as per an aspect of an embodiment of the present invention. A wireless device receives at least one message from a base station at 1910. The at least one first message may comprise configuration parameters of a plurality of cells. The plurality of cells may be grouped into a plurality of physical uplink control channel (PUCCH) groups. The PUCCH groups may comprise a primary PUCCH group, and/or a secondary PUCCH group. The primary PUCCH group may comprise a primary cell with a primary PUCCH transmitted to the base station. The secondary PUCCH group may comprise a PUCCH secondary cell with a secondary PUCCH transmitted by the base station. According to an embodiment, the configuration parameters may comprise a plurality of common parameters. The configuration parameters may comprise a plurality of dedicated parameters.

A second message comprising one or more parameters indicating a release of the PUCCH secondary cell may be received at 1920. Each of the first plurality of secondary cells in the secondary PUCCH group may be released at 1930.

According to an embodiment, the base station may detect a radio link issue with the PUCCH secondary cell employing the detection of a loss of PUCCH secondary cell signals. The base station may also detect a radio link issue with the PUCCH secondary cell employing detecting a loss of synchronization with the PUCCH secondary cell signals. The base station may also detect a radio link issue with the PUCCH secondary cell employing measuring high error rates on the PUCCH secondary cell. According to an embodiment, the base station may detect a radio link issue with the PUCCH secondary cell employing measuring high interference on the PUCCH secondary cell. The base station may also detect a radio link issue with the PUCCH secondary cell employing receiving a channel quality indicator (CQI) feedback indicating poor signal quality on the PUCCH secondary cell. The base station may also detect a radio link issue with the PUCCH secondary cell employing receiving measurement reports indicating poor signal quality on the PUCCH secondary cell.

According to an embodiment, the wireless device may further comprise transmitting a second message indicating a radio link issue with the PUCCH secondary cell. According to an embodiment, at least one message may comprise a cell index of the PUCCH secondary cell. According to an embodiment, channel state information may be transmitted on the secondary PUCCH.

Figure 20:
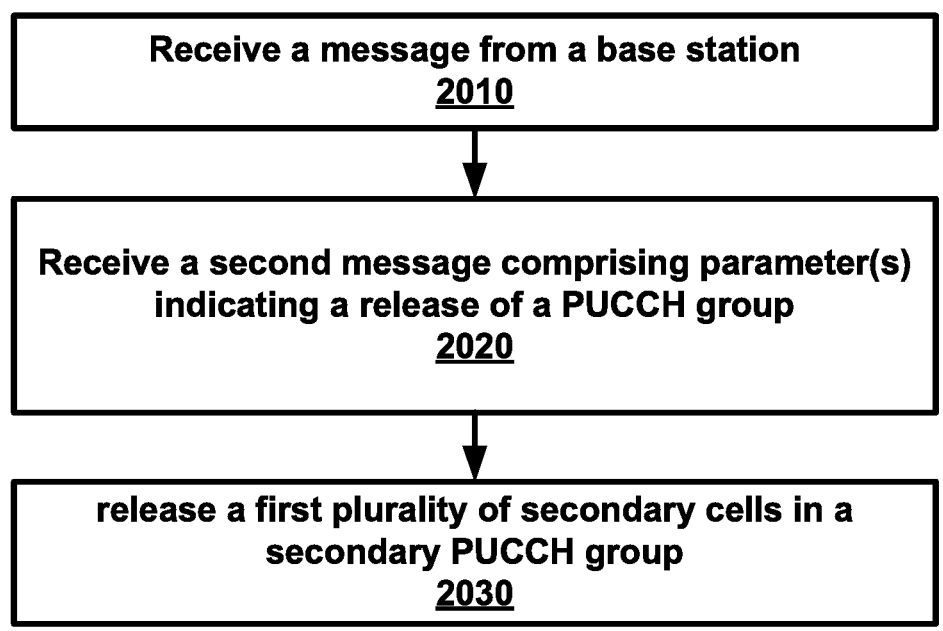
FIG. 20 is an example flow diagram as per an aspect of an embodiment of the present invention.

FIG. 20 is an example flow diagram as per an aspect of an embodiment of the present invention. A wireless device receives at least one message from a base station at 2010. The at least one first message may comprise configuration parameters of a plurality of cells. The plurality of cells may be grouped into a plurality of physical uplink control channel (PUCCH) groups. The PUCCH groups may comprise a primary PUCCH group, and/or a secondary PUCCH group. The primary PUCCH group may comprise a primary cell with a primary PUCCH transmitted to the base station. The secondary PUCCH group may comprise a PUCCH secondary cell with a secondary PUCCH transmitted by the base station. According to an embodiment, the configuration parameters may comprise a plurality of common parameters. The configuration parameters may comprise a plurality of dedicated parameters.

A second message comprising one or more parameters indicating a release of the secondary PUCCH group may be received at 2020. Each of the first plurality of secondary cells in the secondary PUCCH group may be released at 2030.

According to an embodiment, the base station may detect a radio link issue with the PUCCH secondary cell employing detecting a loss of PUCCH secondary cell signals. The base station may also detect a radio link issue with the PUCCH secondary cell employing detecting a loss of synchronization with the PUCCH secondary cell signals. The base station may also detect a radio link issue with the PUCCH secondary cell employing measuring high error rates on the PUCCH secondary cell.

According to an embodiment, a second message indicating a radio link issue with the PUCCH secondary cell may be transmitted. According to an embodiment, at least one message may comprise a cell index of the secondary PUCCH group. According to an embodiment, channel state information may be transmitted on the secondary PUCCH.

Figure 21:
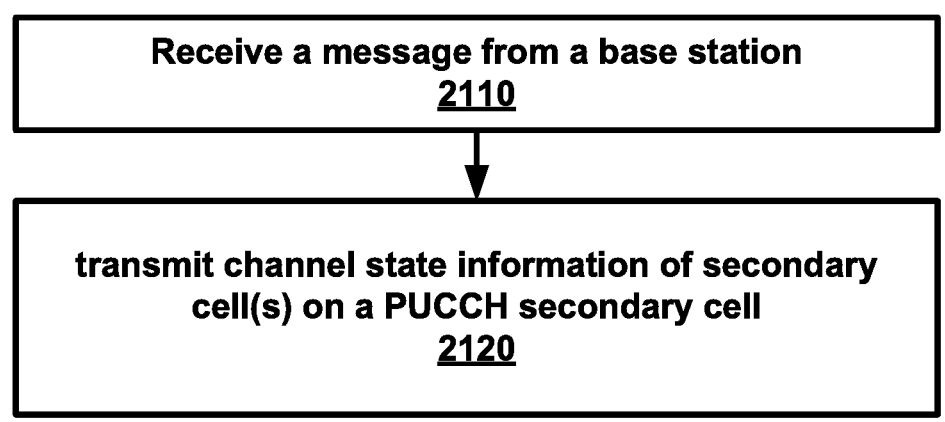
FIG. 21 is an example flow diagram as per an aspect of an embodiment of the present invention.

FIG. 21 is an example flow diagram as per an aspect of an embodiment of the present invention. A wireless device receives at least one message from a base station at 2110. The at least one first message may comprise a plurality of parameters of a plurality of cells. The plurality of cells may be grouped into a plurality of physical uplink control channel (PUCCH) groups. The PUCCH groups may comprise a primary PUCCH group, and/or a secondary PUCCH group. The primary PUCCH group may comprise a primary cell with a primary PUCCH. The secondary PUCCH group may comprise a PUCCH secondary cell with a secondary PUCCH. According to an embodiment, the configuration parameters may comprise a plurality of common parameters. The plurality of parameters may comprise configuration parameters for a secondary cell in the plurality of cells. The secondary cell may be mapped to the secondary PUCCH group if a first parameter is present in the configuration parameters. Otherwise, the secondary cell may be mapped to the primary PUCCH group. The secondary cell may be considered to be the PUCCH secondary cell if PUCCH parameters are present in the configuration parameters.

According to an embodiment, the first parameter may be a dedicated parameter. According to an embodiment, the PUCCH parameters may comprise a plurality of PUCCH common parameters. The PUCCH parameters may also comprise a plurality of PUCCH dedicated parameters. According to an embodiment, the secondary cell may not be considered to be the PUCCH secondary cell if PUCCH parameters are not present in the configuration parameters. According to an embodiment, the PUCCH parameters may comprise at least one parameter related to a hybrid automatic repeat request (HARQ).

Channel state information of one or more secondary cells on the PUCCH secondary cell may be transmitted at 2120. According to an embodiment, channel state information may be transmitted on the secondary PUCCH. According to an embodiment, channel state information for the secondary cell on the PUCCH secondary cell may be transmitted if the first parameter is present in the configuration parameters for the secondary cell.

Figure 22:
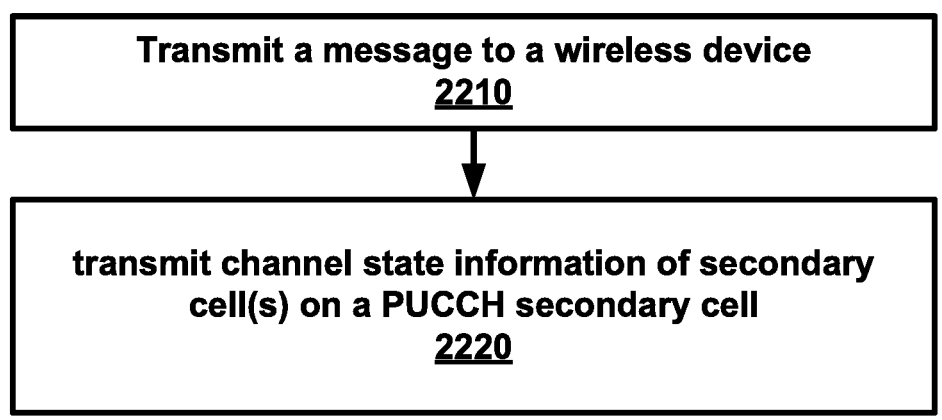
FIG. 22 is an example flow diagram as per an aspect of an embodiment of the present invention.

FIG. 22 is an example flow diagram as per an aspect of an embodiment of the present invention. A base station may transmit at least one message to a wireless device at 2210. The at least one first message may comprise a plurality of parameters of a plurality of cells. The plurality of cells may be grouped into a plurality of physical uplink control channel (PUCCH) groups. The PUCCH groups may comprise a primary PUCCH group, and/or a secondary PUCCH group. The primary PUCCH group may comprise a primary cell with a primary PUCCH. The secondary PUCCH group may comprise a PUCCH secondary cell with a secondary PUCCH. According to an embodiment, the configuration parameters may comprise a plurality of common parameters. The plurality of parameters may comprise configuration parameters for a secondary cell in the plurality of cells. The secondary cell may be mapped to the secondary PUCCH group if a first parameter is present in the configuration parameters. Otherwise, the secondary cell may be mapped to the primary PUCCH group. The secondary cell may be considered to be the PUCCH secondary cell if PUCCH parameters are present in the configuration parameters.

According to an embodiment, the first parameter may be a dedicated parameter. According to an embodiment, the PUCCH parameters may comprise a plurality of PUCCH common parameters. The PUCCH parameters may also comprise a plurality of PUCCH dedicated parameters. According to an embodiment, the secondary cell may not be considered to be the PUCCH secondary cell if PUCCH parameters are not present in the configuration parameters. According to an embodiment, the PUCCH parameters may comprise at least one parameter related to a hybrid automatic repeat request (HARQ).

Channel state information of one or more secondary cells on the PUCCH secondary cell may be received at 2220. According to an embodiment, channel state information for the secondary cell on the PUCCH secondary cell may be received if the first parameter is present in the configuration parameters for the secondary cell.

Figure 23:
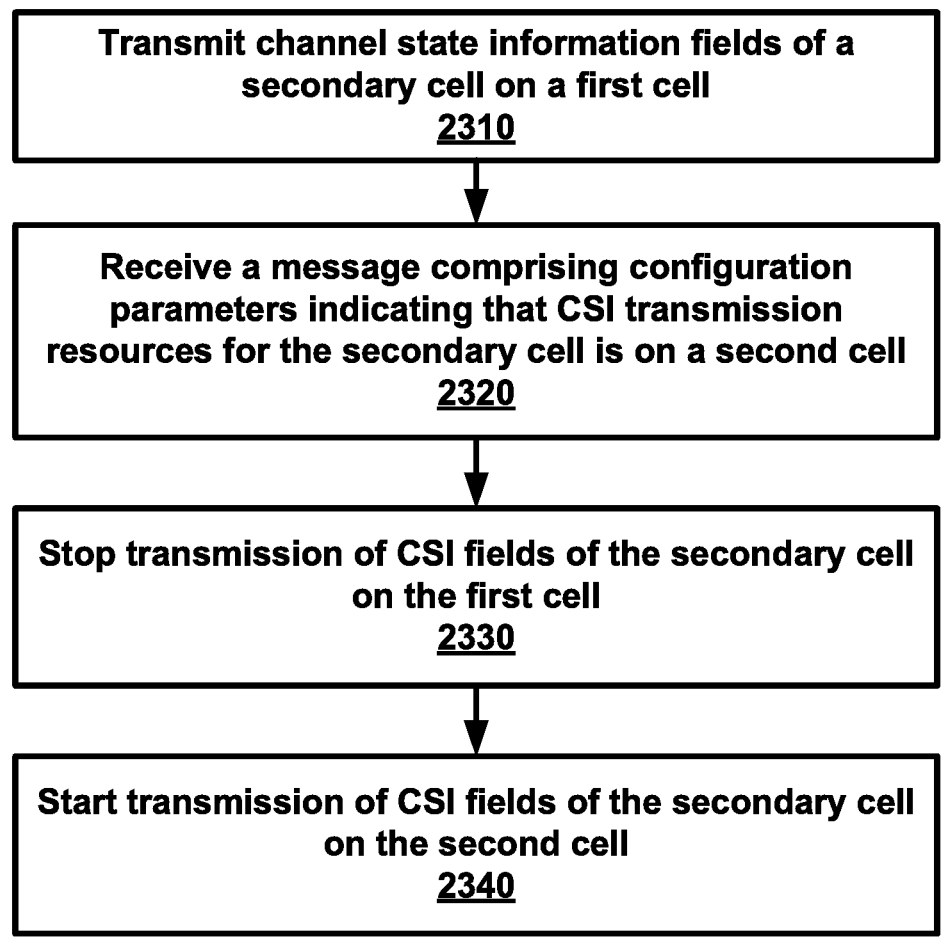
FIG. 23 is an example flow diagram as per an aspect of an embodiment of the present invention.

FIG. 23 is an example flow diagram as per an aspect of an embodiment of the present invention. A wireless device transmits channel state information (CSI) fields of a secondary cell on a first cell in a plurality of cells at 2310. At 2320, a message may be received in subframe n. The message may comprise one or more configuration parameters indicating that CSI transmission resources for the secondary cell may be on a second cell. The second cell may be different from the first cell. At 2330, in subframe n+p, transmission of CSI fields of the secondary cell on the first cell may be stopped. p may be a number greater than one. At 2340, in subframe n+k, transmission of CSI fields of the secondary cell on the second cell may be started. k may be a number greater than p.

According to an embodiment, the wireless device may maintain an activation status for the secondary cell after receiving the message and until subframe n+k. According to an embodiment, the message may not be configured to cause a change in an activation status of the secondary cell. According to an embodiment, a second messages may be received. The second message may comprise one or more second configuration parameters indicating second CSI transmission resources for the secondary cell. The second CSI transmission resources may be on the first cell.

According to an embodiment, the plurality of cells may be grouped into a plurality of physical uplink control channel (PUCCH) groups. The PUCCH groups may comprise a primary PUCCH group and/or a secondary PUCCH group. The primary PUCCH group may comprising the first cell with a primary PUCCH transmitted to the base station. The secondary PUCCH group may comprise the second cell with a secondary PUCCH transmitted to the base station.

According to an embodiment, the first cell may be a primary cell and the second cell may be a PUCCH secondary cell. According to an embodiment, the first cell may be a PUCCH secondary cell and the second cell may be a primary cell. According to an embodiment, the second cell may be initially deactivated when configured. According to an embodiment, at least one transport block may be transmitted and/or received in a subframe between subframe n and subframe n+k. According to an embodiment, a control channel in subframes from subframe n to subframe n+k may be monitored.

Figure 24:
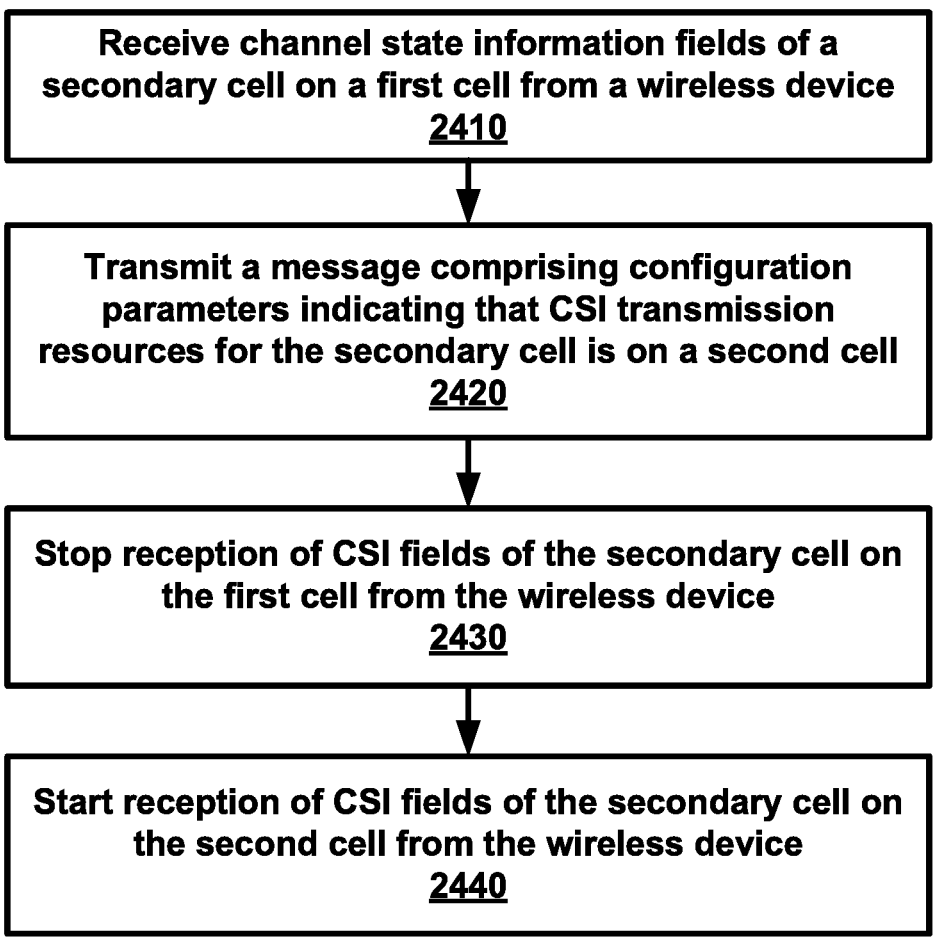
FIG. 24 is an example flow diagram as per an aspect of an embodiment of the present invention.

FIG. 24 is an example flow diagram as per an aspect of an embodiment of the present invention. A base station may receive, from a wireless device, channel state information (CSI) fields of a secondary cell on a first cell in a plurality of cells at 2410. At 2420, a message may be transmitted in subframe n. The message may comprise one or more configuration parameters indicating that CSI transmission resources for the secondary cell may be on a second cell. The second cell may be different from the first cell. At 2430, in subframe n+p, reception of CSI fields of the secondary cell on the first cell may be stopped. p may be a number greater than one. At 2440, in subframe n+k, reception of CSI fields of the secondary cell on the second cell may be started. k may be a number greater than p.

According to an embodiment, the base station may maintain an activation status for the secondary cell in the wireless device after receiving the message and until subframe n+k. According to an embodiment, the message may not be configured to cause a change in an activation status of the secondary cell. According to an embodiment, a second messages may be transmitted. The second message may comprise one or more second configuration parameters indicating second CSI transmission resources for the secondary cell. The second CSI transmission resources may be on the first cell.

According to an embodiment, the plurality of cells may be grouped into a plurality of physical uplink control channel (PUCCH) groups. The PUCCH groups may comprise a primary PUCCH group and/or a secondary PUCCH group. The primary PUCCH group may comprising the first cell with a primary PUCCH received by the base station. The secondary PUCCH group may comprise the second cell with a secondary PUCCH received by the base station.

According to an embodiment, the first cell may be a primary cell and the second cell may be a PUCCH secondary cell. According to an embodiment, the first cell may be a PUCCH secondary cell and the second cell may be a primary cell. According to an embodiment, the second cell may be initially deactivated when configured. According to an embodiment, at least one transport block may be transmitted and/or received in a subframe between subframe n and subframe n+k. According to an embodiment, a control channel in subframes from subframe n to subframe n+k may be monitored.

A Primary PUCCH group may comprise a group of serving cells including PCell whose PUCCH signalling may be associated with the PUCCH on PCell. A PUCCH group may comprise either a primary PUCCH group and/or a secondary PUCCH group. A PUCCH SCell may comprise a Secondary Cell configured with PUCCH. A Secondary PUCCH group may comprise a group of SCells whose PUCCH signalling may be associated with the PUCCH on the PUCCH SCell. A Timing Advance Group may comprise a group of serving cells that configured by an RRC and/or that, for the cells with an UL configured, may use the same timing reference cell and the same Timing Advance value. A Primary Timing Advance Group may comprise a Timing Advance Group containing the PCell. A Secondary Timing Advance Group may comprise a Timing Advance Group not containing the PCell.

With respect to a Physical uplink control channel, a PUCCH may be transmitted on a PCell, a PUCCH SCell (if such is configured in CA) and/or on PSCell (in DC).

With respect to Carrier Aggregation. The configured set of serving cells for a UE may comprise a PCell and one or more SCells: If DC is not configured, one additional PUCCH can be configured on an SCell, the PUCCH SCell; when a PUCCH SCell is configured, RRC may configure the mapping of each serving cell to a Primary PUCCH group and/or a Secondary PUCCH group, (i.e., for each SCell whether the PCell or the PUCCH SCell is used for the transmission of ACK/NAKs and CSI reports).

With respect to a PUCCH SCell configuration, there may be an agreement to use release/add and not introduce modification(s). Configuration of a PUCCHConfigCommonSCell and/or a PUCCHConfigDedicatedSCell may be provided only for a PUCCH SCell An example of secondary cell parameters may comprise: SCellToAddMod-r10::=SEQUENCE {sCellIndex-r10 sCellIndex-r10, cellIdentification-r10 SEQUENCE {physCellId-r10 PhysCellId, dl-CarrierFreq-r10 ARFCN-ValueEUTRA} OPTIONAL, --Cond SCellAdd radioResourceConfigCommonSCell-r10 RadioResourceConfigCommonSCell-r10 OPTIONAL, --Cond SCellAdd radioResourceConfigDedicatedSCell-r10 RadioResourceConfigDedicatedSCell-r10 OPTIONAL, --Cond SCellAdd2.

With respect to a RadioResourceConfigCommon, the IE RadioResourceConfigCommonSIB and IE RadioResourceConfigCommon may be used to specify common radio resource configurations in the system information and in the mobility control information, respectively, (e.g., the random access parameters and the static physical layer parameters).

An example of PUCCH parameters may comprise: RadioResourceConfigCommonSCell-r10::=SEQUENCE {[[pucch-ConfigCommon-r13 PUCCH-ConfigCommon OPTIONAL, --Cond UL uplinkPowerControlCommonSCell-v13xx UplinkPowerControlCommonPSCell-r12 OPTIONAL--Cond UL.

With respect to a Conditional presence, the SCellAdd field may be present upon SCell addition; otherwise it may not be present. An IE PhysicalConfigDedicated may be used to specify a UE specific physical channel configuration. For example, PhysicalConfigDedicated information element may include:
PhysicalConfigDedicatedSCell
pucch-ConfigDedicatedExt1, pucch-ConfigDedicatedExt2, pucch-ConfigDedicatedExt3, pucch-ConfigDedicatedExt, pucch-Cell. A PUCCH-SCell field may be optionally present for a PUCCH SCell. Otherwise it may not be present.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

What is claimed is:

1. A method comprising:
    transmitting, by a base station to a wireless device, at least one first message comprising configuration parameters of a plurality of cells, wherein the plurality of cells are grouped into a plurality of physical uplink control channel (PUCCH) groups comprising:
        a primary PUCCH group comprising a primary cell with a primary PUCCH received by the base station; and
        a secondary PUCCH group comprising a PUCCH secondary cell with a secondary PUCCH received by the base station;
    receiving, by the base station, first CSI on the primary cell and second CSI on the PUCCH secondary cell;
    detecting, by the base station, a radio link issue with the PUCCH secondary cell while one or more other cells in the secondary PUCCH group have acceptable radio link quality; and
    transmitting, by the base station, at least one second message configured to release at least one of the one or more other cells in the secondary PUCCH group.

2. The method of claim 1, wherein the at least one second message is further configured to release the PUCCH secondary cell.

3. The method of claim 1, wherein the configuration parameters comprise:
    a plurality of common parameters; and
    a plurality of dedicated parameters.

4. The method of claim 1, wherein the detecting the radio link issue employs at least one of the following:
    detecting a loss of PUCCH secondary cell signals;
    detecting a loss of synchronization with the PUCCH secondary cell signals; and
    measuring high error rates on the PUCCH secondary cell.

5. The method of claim 1, wherein the detecting the radio link issue employs at least one of the following:
    measuring high interference on the PUCCH secondary cell;
    receiving a channel quality indicator (CQI) feedback indicating poor signal quality on the PUCCH secondary cell; and
    receiving measurement reports indicating poor signal quality on the PUCCH secondary cell.

6. The method of claim 1, wherein the detecting the radio link issue occurs when the base station receives a third message from the wireless device.

7. The method of claim 1, wherein transmitting the at least one second message comprises at least one cell index of the at least one of the one or more other cells.

8. A method comprising:
    transmitting, by a base station to a wireless device, at least one first message comprising configuration parameters of a plurality of cells, wherein the plurality of cells are grouped into a plurality of physical uplink control channel (PUCCH) groups comprising:
        a primary PUCCH group comprising a primary cell with a primary PUCCH received by the base station; and
        a secondary PUCCH group comprising a PUCCH secondary cell with a secondary PUCCH received by the base station;
    receiving, by the base station, first CSI on the primary cell and second CSI on the PUCCH secondary cell;
    detecting, by the base station, a radio link issue with the PUCCH secondary cell while one or more other cells in the secondary PUCCH group have acceptable radio link quality; and
    transmitting, by the base station, at least one second media access control (MAC) command configured to deactivate at least one of the one or more other cells in the secondary PUCCH group.

9. The method of claim 8, wherein at least one second MAC command is further configured to deactivate the PUCCH secondary cell.

10. The method of claim 8, wherein the configuration parameters comprise:
    a plurality of common parameters; and
    a plurality of dedicated parameters.

11. The method of claim 8, wherein the detecting the radio link issue employs at least one of the following:
    detecting a loss of PUCCH secondary cell signals;
    detecting a loss of synchronization with the PUCCH secondary cell signals; and
    measuring high error rates on the PUCCH secondary cell.

12. The method of claim 8, wherein the detecting the radio link issue employs at least one of the following:
    measuring high interference on the PUCCH secondary cell;
    receiving a channel quality indicator (CQI) feedback indicating poor signal quality on the PUCCH secondary cell; and
    receiving measurement reports indicating poor signal quality on the PUCCH secondary cell.

13. The method of claim 8, wherein the detecting the radio link issue occurs when the base station receives a third message from the wireless device.

14. The method of claim 8, wherein transmitting the at least one second MAC command comprises a bitmap indicating deactivation of the at least one of the one or more other cells.

15. A base station comprising:
    one or more processors; and
    memory storing instructions that, when executed, cause the base station to:
        transmit, to a wireless device, at least one first message comprising configuration parameters of a plurality of cells, wherein the plurality of cells are grouped into a plurality of physical uplink control channel (PUCCH) groups comprising:
            a primary PUCCH group comprising a primary cell with a primary PUCCH received by the base station; and
            a secondary PUCCH group comprising a PUCCH secondary cell with a secondary PUCCH received by the base station;
        receive first CSI on the primary cell and second CSI on the PUCCH secondary cell;
        detect a radio link issue with the PUCCH secondary cell, while one or more other cells in the secondary PUCCH group has acceptable radio link quality; and
        transmit at least one second MAC command configured to deactivate at least one of the one or more other cells in the secondary PUCCH group.

16. The base station of claim 15, wherein at least one second MAC command is further configured to deactivate the PUCCH secondary cell.

17. The base station of claim 15, wherein the configuration parameters comprise:
- a plurality of common parameters; and
- a plurality of dedicated parameters.

18. The base station of claim 15, wherein the instructions, when executed, further cause the base station to:
- detect a loss of the PUCCH secondary cell signals;
- detect a loss of synchronization with the PUCCH secondary cell signals; or
- measure high error rates on the PUCCH secondary cell.

19. The base station of claim 15, wherein instructions, when executed, further cause the base station to:
- measure high interference on the PUCCH secondary cell;
- receive a channel quality indicator (CQI) feedback indicating poor signal quality on the PUCCH secondary cell; or
- receiving measurement reports indicating poor signal quality on the PUCCH secondary cell.

20. The base station of claim 15, wherein the base station detects the radio link issue when the base station receives a third message from the wireless device.

* * * * *